(12) United States Patent
Jordan et al.

(10) Patent No.: US 12,082,577 B2
(45) Date of Patent: Sep. 10, 2024

(54) METHODS AND COMPOSITIONS FOR MODIFYING PLANT GROWTH AND REDUCING WATER CONSUMPTION BY PLANTS

(71) Applicant: JRX Biotechnology, Inc., Newport Beach, CA (US)

(72) Inventors: Frederick L. Jordan, Santa Ana, CA (US); Christopher S. Jordan, Santa Ana, CA (US)

(73) Assignee: JRX Biotechnology, Inc., Orange, CA (US)

(*) Notice: Subject to any disclaimer, the term of this patent is extended or adjusted under 35 U.S.C. 154(b) by 1314 days.

(21) Appl. No.: 16/338,404

(22) PCT Filed: Sep. 15, 2017

(86) PCT No.: PCT/US2017/051844
§ 371 (c)(1),
(2) Date: Mar. 29, 2019

(87) PCT Pub. No.: WO2018/063828
PCT Pub. Date: Apr. 5, 2018

(65) Prior Publication Data
US 2020/0022364 A1    Jan. 23, 2020

Related U.S. Application Data

(60) Provisional application No. 62/401,642, filed on Sep. 29, 2016.

(51) Int. Cl.
*A01N 65/08* (2009.01)
*A01N 25/04* (2006.01)

(52) U.S. Cl.
CPC ............. *A01N 25/04* (2013.01); *A01N 65/08* (2013.01)

(58) Field of Classification Search
CPC ........ A01N 25/04; A01N 25/30; A01N 37/02; A01N 65/08
USPC ...................................................... 504/320
See application file for complete search history.

(56) References Cited

U.S. PATENT DOCUMENTS

| | | | |
|---|---|---|---|
| 3,288,824 A | 11/1966 | Mahler et al. | |
| 4,870,103 A | 9/1989 | Hoechst | |
| 5,314,506 A | 5/1994 | Midler et al. | |
| 6,274,570 B1 | 8/2001 | Vogt et al. | |
| 6,302,958 B1 | 10/2001 | Lindrud et al. | |
| 6,432,884 B1 | 8/2002 | Lachut | |
| 7,399,730 B2 | 7/2008 | Kostka et al. | |
| 7,815,807 B2 | 10/2010 | Bassett | |
| 9,131,679 B2 | 9/2015 | Di Modugno et al. | |
| 9,403,132 B2 | 8/2016 | Hata | |
| 9,796,896 B2 | 10/2017 | Lynch et al. | |
| 10,624,352 B2 | 4/2020 | Radhakrishnan et al. | |
| 11,634,368 B2 | 4/2023 | Jordan et al. | |
| 2002/0045549 A1 | 4/2002 | Kruger et al. | |
| 2008/0154210 A1 | 6/2008 | Jordan et al. | |
| 2009/0081292 A1 | 3/2009 | Otomo et al. | |
| 2010/0099717 A1 | 4/2010 | Vermeer et al. | |
| 2011/0177948 A1* | 7/2011 | Vermeer ................ | A01N 51/00 504/253 |
| 2011/0224076 A1* | 9/2011 | Sowa | |
| 2012/0315308 A1 | 12/2012 | Travers | |
| 2013/0150240 A1 | 6/2013 | Newman et al. | |
| 2015/0374835 A1 | 12/2015 | Jordan et al. | |
| 2018/0251776 A1 | 9/2018 | Riley | |
| 2019/0048307 A1 | 2/2019 | Morash et al. | |
| 2021/0032177 A1 | 2/2021 | Jordan et al. | |
| 2024/0067581 A1 | 2/2024 | Jordan et al. | |

FOREIGN PATENT DOCUMENTS

| | | | |
|---|---|---|---|
| CN | 1337888 | 2/2002 | |
| CN | 103282052 | 9/2013 | |
| CN | 103596421 | 2/2014 | |
| CN | 105125426 | 12/2015 | |
| EP | 0244754 | 11/1987 | |
| JP | 2010-075089 | 4/2010 | |
| JP | 2014-510742 | 5/2014 | |
| WO | 2005/041661 A1 * | 5/2005 | |
| WO | WO 2012/167091 | 6/2012 | |
| WO | WO 2014/090988 | 6/2014 | |
| WO | WO-2014090988 A1 * | 6/2014 | ............. A01N 37/38 |

OTHER PUBLICATIONS

Patel (Lipid Insights, Published Aug. 9, 2016, pp. 1-12) (Year: 2016).*
Bunderson et al., "Tools for Evaluating Native Grasses as Low Maintenance Turf," HortTech., 19(3):626-32, Jan. 2009.
Carrow and Duncan, "Improving Drought Resistance and Persistence in Turf-Type Tall Fescue," Crop Sci., 43(3):978-84, May 2003.
Chaichi et al., "Surfactant application on yield and irrigation water use efficiency in corn under limited irrigation," Crop Science, 55(1):386-93, 2015.
Da Silva et al., "Oil-in-water biocompatible microemulsion as a carrier for the antitumor drug compound methyl dihydrojasmonate," International journal of nanomedicine, 10:585, 2015.
Dadresan et al., "Effect of salinity stress and surfactant treatment on physiological traits and nutrient absorption of fenugreek plant," Communications in Soil Science and Plant Analysis, 46(22):2807-20, Dec. 2015.

(Continued)

*Primary Examiner* — Alma Pipic
(74) *Attorney, Agent, or Firm* — Fish & Richardson P.C.

(57) ABSTRACT

The present invention provides compositions and methods for reducing water consumption by plants and for modifying the growth of plants. The present invention further provides methods for preparing bioactive solutions and micro and nano emulsions comprising water-soluble or water-miscible oils and/or non-water-soluble oils, which find use in the methods for reducing water consumption by plants and/or for modifying the growth of plants.

15 Claims, 14 Drawing Sheets

(56) References Cited

OTHER PUBLICATIONS

FAO.org[online], "2050: A third more mouths to feed" Sep. 23, 2009, retrieved on Aug. 28, 2019, retrived from URL <http://www.fao.org/news/story/en/item/35571/icode/>, 4 pages.
Gupta et al., "Preparation of prospective plant oil derived microemulsion vehicles for drug delivery," Indian Journal of Biochemistry & Biophysics, 43:254-57, Aug. 2006.
Karcher and Richardson, "Quantifying Turfgrass Color Using Digital Image Analysis," Crop Sci., 43(3):943-51, Jun. 2003.
Karcher and Richardson, "Digital image analysis in turfgrass research," Argonomy Monograph, 1133-49, 2013.
Mittal, "Determination of CMC of polysorbate 20 in aqueous solution by surface tension method," Journal of pharmaceutical sciences, 61(8):1334-5, Aug. 1972.
Narang et al., "Stable drug encapsulation in micelles and microemulsion," Int. J. Pharm., 345(1-2):9-25, Dec. 2007.
PCT International Preliminary Report on Patentability in International Appln. No. PCT/US2017/051844 dated Apr. 11, 2019, 11 pages.
PCT International Search Report and Written Opinion in International Appln. No. PCT/US2017/051844 dated Dec. 1, 2017, 17 pages.
Richardson et al., "Quantifying Turfgrass Cover Using Digital Image Analysis," Crop Sci., 41(6):1884-8, Nov. 2001.
Schiavon et al., "Bermudagrass and Seashore Paspalum Establishment from Seed Using Differing Irrigation Methods and Water Qualities," Agron. J., 104(3):706-14, May 2012.
Shaikh and Kumbharkhane, "Dielectric relaxation studies of aqueous solution of polyethylene glycol 200 (PEG200), using time-domain reflectometry," Physics and Chemistry of Liquids, 53(5):627-37, Sep. 2015.
Shaver et al., "Dormant Seeding Bermudagrass Cultivars in a Transition-Zone Environment," Crop Sci., 46(4):1787-92, Jul. 2006.
Singla and Patanjali, "Phase behaviour of neem oil based microemulsion formulations," Industrial crops and products, 44:421-6, Jan. 2013.
Sorochan et al., "Segway and Golf Car Wear on Bermudagrass Fairway Turf," Appl. Turfgrass Sci., 3(1):63-70, Jul. 2006.
Warisnoicharoen et al., "Nonionic oil-in-water microemulsions: the effect of oil type on phase behaviour," International journal of pharmaceutics, 198(1):7-27, Mar. 2000.
Yang, "Effects of a nonionic surfactant on plant growth and physiology," PhD diss., 2008.
Alanwood.net [online], "Compendium of Pesticide Common Names: Index of Common Names," available on or before Jun. 20, 2002, via Internet Archive: Wayback Machine URL<https://web.archive.org/web/20020620134924/http://alanwood.net/pesticides/index_en_frame.html>, retrieved on Mar. 5, 2021, retrieved from URL<http://alanwood.net/pesticides/index_en_frame.html>, 1 page.
Chemistry and Technology of Agrochemical Formulations, 1st ed., Knowles (ed.), 1998, 483 pages.
Cox et al., "Macadamia Husk Compost Improves Soil Health in Sub-Tropical Horticulture," Presented at Proceedings of the 3rd Australian New Zealand Soils Conference, Sydney, Australia, Dec. 5-9, 2004, 8 pages.
De Lucas et al., "Influence of Operation Variables on Quality Parameters of Olive Husk Oil Extracted with CO2: Three-Step Sequential Extraction," J. Am. Oil Chem. Society, Feb. 2003, 80(2):181-188.
Flora Tech, "Formulation Guide: A quantitative comparison of 17 common PEG ingredients' relative attributes," dated May 31, 2009, 12 pages.
Fungicide Resistance Action Committee, "FRAC Code List 2018: Fungicides Sorted by Mode of Action (including FRAC Code numbering)," dated Feb. 2018, 14 pages.
Hanisco, "Reduce waste with a quality surfactant program," Greenhouse Product News, Jan. 2015, 3 pages.
hrcaglobal.com [online], "Global Herbicide Classification Lookup," available on or before Aug. 30, 2016, via Internet Archive: Wayback Machine URL<https://web.archive.org/web/20160830025851/http://hracglobal.com/tools/classification-lookup>, retrieved on Mar. 5, 2021, retrieved from URL<http://hracglobal.com/tools/classification-lookup>, 2 pages.
MarvelOils.com [online], "Macadamia Oil Benefits, Uses, Recipes," available on or before Sep. 19, 2014 via Internet Archive: Wayback Machine URL<https://web.archive.org/web/20140919153023/www.marveloils.com/browse-by-oil/macadamia-oil/>, retrieved on Mar. 5, 2021, retrieved from URL<https://www.marveloils.com/browse-by-oil/macadamia-oil/>, 4 pages.
Scotts, "Aqua-Grol L with PsiMatric Technology: Liquid Formulation," dated Oct. 30, 200, 3 pages.
Sparks et al., "IRAC: Mode of Action Classification and Insecticide Resistance Management," Pestic. Biochem. Physiology, Jun. 2015, 121:122-128.
Syngenta, "Safety Data Sheet: Quadris," dated Sep. 6, 2004, 20 pages (with Machine English Translation).
U.S. Appl. No. 17/042,648, filed Sep. 28, 2020, Christopher S. Jordan, Published.
Bethke, "Aquatrols AquaGro with PsiMatric Technology," Aquatrols, Jun. 2012, 1 page.
Bethke, "Influence of Aquatrols AquaGro L with PsiMatric™ Technology on Water Management and Crop Growth," Aquatrols, Jan. 1999, 2 pages.
Falk et al., "Surfactant-Induced Phytotoxicity," Weed Technology, Jul. 1994, 8:519-525.
No Author, "Final Report on the Safety Assessment of PEG (Polyethylene Glycol)-2, -4, -6, -8, -12, -20, -32, -75, and -150 Dilaurate; PEG-2, -4, -6, -8, -9, -10, -12, -14, -20, -32, -75, -150, and -200 Laurate; and PEG-2 Laurate SE[1]," International Journal of Toxicology, Jan. 2000, 19(Suppl. 2):29-41.
Yalabik-Kas et al., "Some Properties of an Ethoxylated Castor Oil and Ethoxylated Oleyl Alcohol," Journal Drug Development and Industrial Pharmacy, Jan. 20, 1982, 8(3):383-396.
Polychniatou et al, "Olive oil microemulsions and study of the emulsifying ability of olive oil endogenous components," Int. Congr. Eng. Food, 2011, 11, 5 pages.
Carmona et al., "Characterization of macadamia and pecan oils and detection of mixtures with other edible seed oils by Raman spectroscopy," Grasas y Aceitas, Sep. 2015, 66(3):e094.
Gimeno et al., "Changes in the phenolic content of low density lipoprotein after olive oil consumption in men. A randomized crossover controlled trial," Br. J. Nutr., Jan. 2008, 98(6):1243-1250.
Hallstar Beauty [online], "Florasolvs® Macadamia-16," available no later that Nov. 10, 2015, retrieved on Nov. 7, 2023, retrieved from URL<https://www.hallstarbeauty.com/product/florasolvs-macadamia-16/>.
Kerr et al., "Lipid digestibility and energy content of distillers' corn oil in swine and poultry," J. Anim. Sci., Jul. 2016, 94(7):2900-2908.
Khallouki et al., "Consumption of argan oil (Morocco) with its unique profile of fatty acids, tocopherols, squalene, sterols and phenolic compounds should confer valuable cancer chemopreventive effects," Eur. J. Cancer Prev., Feb. 2003, 12(1):67-75.
Manthey et al., "Foliar Absorption and Phytotoxicity of Quizalofop with Lipid Compounds," Weed Science, Oct.-Dec. 1992, 40(4):558-562, 7 pages (Abstract Only).
Moser et al., "Biodiesel from meadowfoam (*Limnanthes alba* L.) seed oil: Oxidative stability and unusual fatty acid composition," Energy Environ. Sci., Mar. 2010, 3(3):318-327.
Otgonbayar et al., "Fatty acid, Tocopherol and Sterol Composition in Sea buckthorn (*Hippophae rhamnoides* L.) of Mongolia," Mongolian Journal of Chemistry, Sep. 2014, 12(38):126-130.
Premovic et al., "[Influence of Seed Quality on Nutritive Value and Antiradical Capacity of Cold Pressed Sunflower Oil]," Olaj, Szappan, Kozmetika, Jul. 2011, 60:45-50.
Ranade et al., "A review on Persea Americana Mill. (Avocado)—Its fruit and oil," International Journal of PharmaTech Research, Jan. 2015, 8(6):72-77.
Santana et al., "Synthesis of Biodiesel from Sunflower Oil in Microreactor with Circular Obstructions," In: Sunflower Oil: Interactions, Applications and Research, Chapter 4, 29 pages.

(56) References Cited

OTHER PUBLICATIONS

Sham et al., "Bioinformatics Based Comparative Analysis of Omega-3 Fatty Acids in Desert Plants and Their Role in Stress Resistance and Tolerance," Int. J. Plant Res., Jun. 2012, 2(3):80-89.

Talaat et al., "Alleviation of drought-induced oxidative stress in maize (*Zea mays* L.) plants by dual application of 24-epibrassinolide and spermine," Environmental and Experimental Botany, May 2015, 113:47-58.

Vieira et al., "Synthesis of Antioxidant Additive from Safflower Seed Oil," Journal of the Brazilian Chemical Society, Jan. 2021, 32(1):40-46.

Wolosik et al., "The importance and perspective of plant-based squalene in cosmetology," J. Cosmet. Sci., Jan.-Feb. 2013, 64(1):59-65.

\* cited by examiner

FIG. 7A-7D
A
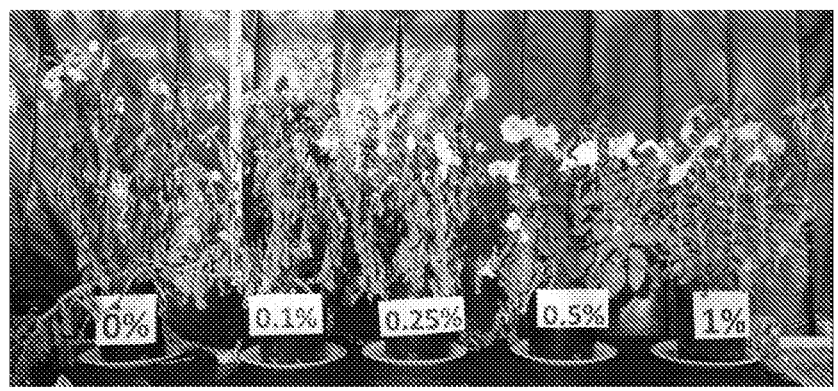
B
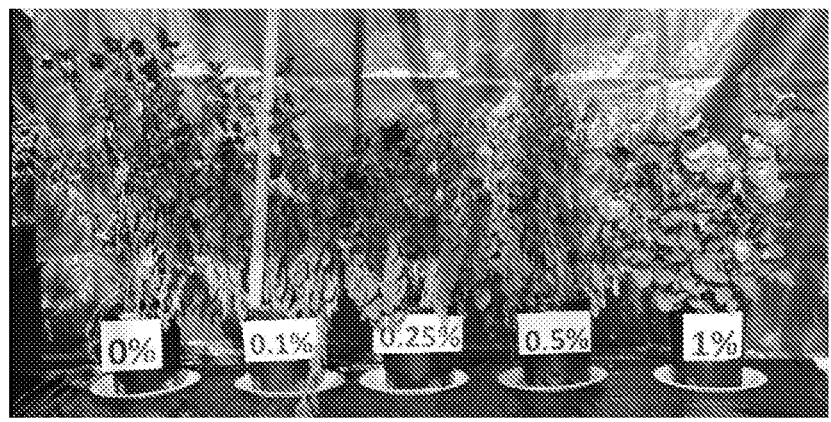

FIG. 7 (contined)
C
D

FIG. 12A-12E
A
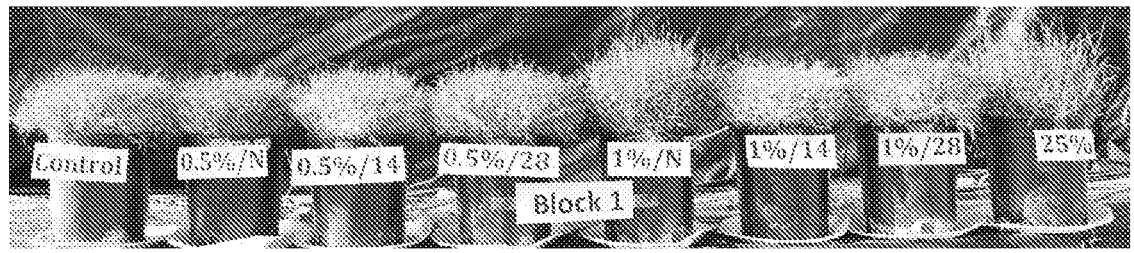
B
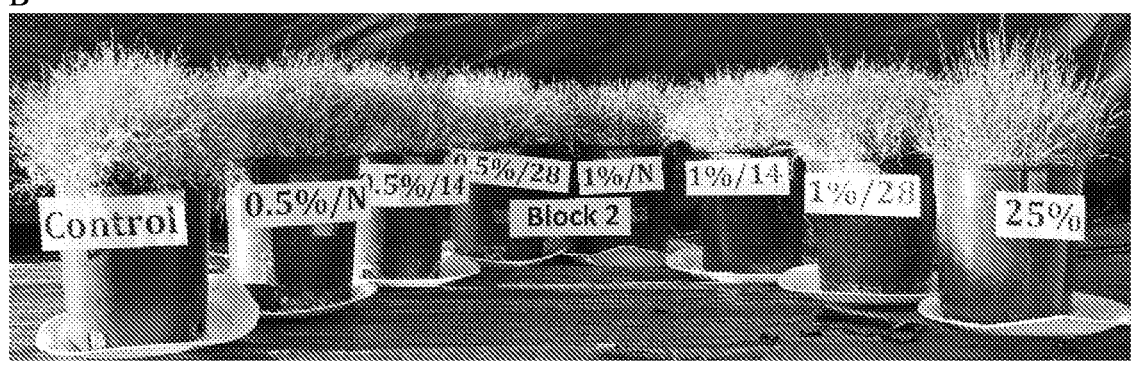
C
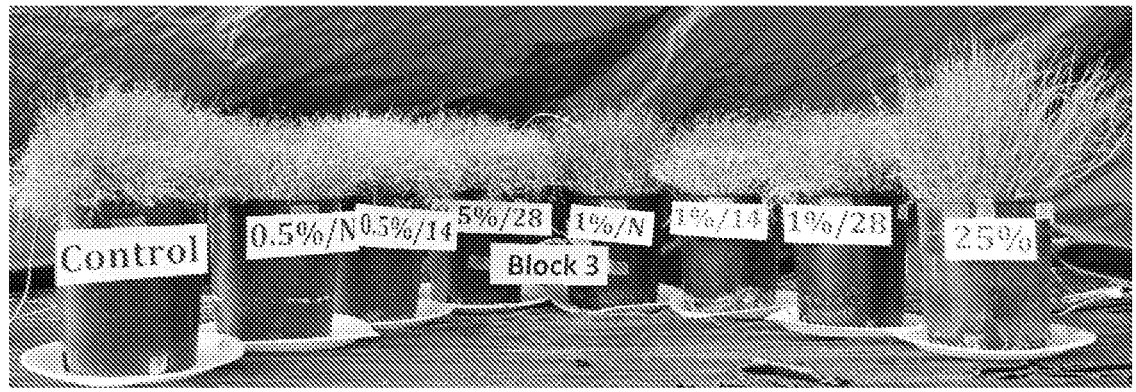
D
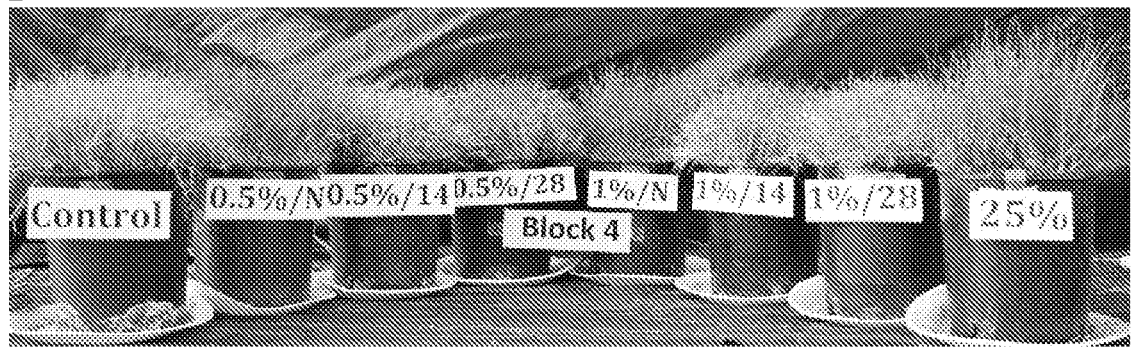

E

METHODS AND COMPOSITIONS FOR MODIFYING PLANT GROWTH AND REDUCING WATER CONSUMPTION BY PLANTS

CROSS-REFERENCE TO RELATED APPLICATIONS

This application is a National Stage application under 35 U.S.C. § 371 of International Application No. PCT/US2017/051844, having an International Filing Date of Sep. 15, 2017, which claims priority to U.S. Application Ser. No. 62/401,642, filed on Sep. 29, 2016. The disclosures of the prior applications are considered part of the disclosure of this application, and are incorporated in their entirety into this application.

FIELD OF THE INVENTION

The present invention relates to the production of agricultural plants and other plants of interest in environments with suboptimal levels of available water.

BACKGROUND OF THE INVENTION

Plants are impacted by a variety of biotic and abiotic stresses that have the potential to negatively impact their growth and development. Biotic stresses are caused by a number of different organisms that can feed on, infect, colonize, or otherwise adversely affect the growth and development of plants. Such organisms include insects, acarids, nematodes, viruses, fungi, bacteria, and even plants such as mistletoes (order Santalales) and witchweed (*Striga* spp.) that are cobligate plant parasites. Unlike biotic stresses, abiotic stresses are not caused by another living organism but rather, by some physical agent or factor that negatively affects the plant itself or the plant's growth environment. Such physical agents or factors include, for example, temperatures that are excessively warm or cold, suboptimal or super optimal levels of nutrients and/or micronutrients in the soil or other growth medium, insufficient or excessive soil water levels, soil and/or water salinity levels that are excessive, lightning, excessive wind, hail, and fire. Other physical agents or factors include those that are caused by human activities including, but not limited to, air and water pollution and the contamination of the soil with synthetic chemicals, heavy metals, or other chemicals that are toxic to plants.

For agricultural plants, biotic and abiotic stresses can cause yield losses and/or negatively impact the quality of the plant and/or the harvestable parts, leading to significant economic losses for farmers or viticulturists. Of the many stresses that affect agricultural plants, plant stress caused by insufficient water level or concentration in the soil to support optimal plant growth and development, which is commonly referred to as drought stress, has always been one of the most important problems for farmers and viticulturists. For agricultural plants grown in fields without irrigation, drought stress can occur whenever there is insufficient rainfall to maintain the soil water at a level or concentration that is capable of supporting optimal plant growth and development. To maintain sufficient soil water levels, farmers and viticulturists often irrigate their fields. However, the amount of fresh water available for use in agricultural production is expected to become scarcer as the world's human population continues to increase.

While the Earth has substantial water resources, the vast majority of the Earth's water is salt water, which cannot be directly used to support agricultural crop production. Only 2.5% of the Earth's water is fresh water, and about 70% of the fresh water is frozen in the icecaps of Antarctica and Greenland (Confalonieri et al. (2007) "Human health. Climate Change 2007: Impacts, Adaptation and Vulnerability," *Contribution of Working Group II to the Fourth Assessment Report of the Intergovernmental Panel on Climate Change*, Parry et al., eds., Cambridge University Press, Cambridge, UK, 391-431). Thus, only about 30% of the fresh water, or about 0.7% of the Earth's total water resources, is available for consumption and use by humans. Id.

Recent estimates indicate that roughly 87% of the available fresh water worldwide is allocated to agricultural purposes. Id. However, the amount of water that is allocated to agriculture is expected to decrease as the world's population increases. This is in spite of the need for increased agricultural production to support the world's growing human population. The Food and Agriculture Organization of the United Nations (FAO) estimates that food production will need to increase by 70% by 2050 to feed an additional 2.3 billion people (FAO (2009) "2050: A third more mouths to feed," FAO News Article, 23 Sep. 2009, Rome). To meet the needs of the Earth's growing population, innovators need to develop new and efficient agricultural and plant production strategies that not only can increase food production, but also decrease water usage.

BRIEF SUMMARY OF THE INVENTION

Aspects of the present invention concern methods and compositions for modifying plant growth and reducing water consumption by plants. Exemplary methods involve contacting a plant with a bioactive solution comprising an effective concentration of water and a water-soluble or water-miscible oil. In some embodiments, the plant is contacted with the bioactive solution by applying the bioactive solution to the soil, or other growth medium, in the vicinity of the plant. In other embodiments, the plant is contacted with the bioactive solution by spraying the bioactive solution on the above-ground portion of the plant (e.g., stem, leaves, or flowers). In some embodiments, the water-soluble or water-miscible oil is an ethoxylated oil, such as an ethoxylated macadamia nut oil having 16 ethoxylations per molecule. In some cases, an ethoxylated oil described herein can have an average number of ethoxylations per molecule of about 10-19. In some cases, the plants contacted with the bioactive solution according to the methods described herein can require less water to maintain the same level of hydration as control plants that were contacted with solution comprising water but lacking a water-soluble or water-miscible oil (e.g., an ethoxylated oil, such as an ethoxylated macadamia nut oil having 16 ethoxylations per molecule). As described herein, the methods and compositions of the present invention can be used to reduce the volume of water that is needed to be applied to plants, plant parts or seed treatments to maintain at least one growth parameter or characteristic at a desired level relative to the volume of water applied to control plants, control plant parts or control seed treatments to maintain the at least one growth parameter or characteristic at the desired level.

Aspects of the present invention also concern methods and compositions for reducing the negative effects of drought stress on plants. Exemplary methods involve contacting a plant with a bioactive solution comprising an effective concentration of a water-soluble oil or water-miscible oil and water. In some embodiments, the plant is contacted with the bioactive solution by applying the bioactive solution to the soil, or other growth medium, in the vicinity of the plant. In other embodiments, the plant is contacted with the bioactive solution by spraying the bioactive solution on the above-ground portion of the plant (e.g., stem, leaves, or flowers). In some embodiments, the water-soluble or water-miscible oil is an ethoxylated oil, such as an ethoxylated macadamia nut oil having 16 ethoxylations per molecule. In some cases, an ethoxylated oil described herein can have an average number of ethoxylations per molecule of about 10-19. In some cases, one or more negative effects of drought stress is/are reduced in the plant that is contacted with the bioactive solution upon exposure of the plant to drought stress, relative to the level or impact of the same negative effect in a control plant, which has not been contacted with the bioactive solution.

In addition, aspects of the present invention concern methods of making a micro or nano emulsion that comprises a water-soluble or water-miscible oil and water. In one aspect, the methods involve mixing an ethoxylated oil, such as an ethoxylated macadamia nut oil having 16 ethoxylations per molecule, with water until the resulting blend is mixed or homogeneous. In another aspect, the methods involve combining non-ethoxylated oil and water. For such non-ethoxylated oil and water, the methods involve sonicating a first fluid jet stream comprising a non-ethoxylated oil, such as macadamia nut oil, and a second fluid jet stream comprising water. The sonicating can be performed by positioning a tip of a sonication probe within a gap defined between a first fluid jet, which emits the first fluid jet stream, and a second fluid jet, which emits the second fluid jet stream, positioned such that the fluid jet streams from the first fluid jet and the second fluid jet, impinge in the gap creating a point of high turbulence at the point of impact of the fluid jet streams, with each of the fluid jet streams having sufficient linear velocity to achieve high intensity mixing of the non-ethoxylated oil and water. The sonicate probe provides the ultrasonic energy in the immediate vicinity of the impinging fluid jet streams, thereby generating the micro or nano emulsion that comprises the non-ethoxylated oil and water.

In another aspect, the methods of making a micro or nano emulsion that comprises a non-ethoxylated oil and water involve providing a first fluid jet stream comprising a non-ethoxylated oil, such as macadamia nut oil, and a second fluid jet stream comprising water, wherein the fluid jet streams are provided by a first fluid jet, which emits the first fluid jet stream, and a second fluid jet, which emits the second fluid jet stream. The first fluid jet and second fluid jet are positioned such that the fluid jet streams from the first fluid jet and the second fluid jet, impinge and create a point of high turbulence at the point of impact of the fluid jet streams. Each of the fluid jet streams can comprise a sufficient linear velocity, such as, for example, 100, 200, 300, 400, 500, 600, 700, 800, or 900 meters/second (m/s) or a linear velocity within a range defined by any two of the aforementioned liner velocities, so as to achieve a high intensity micromixing of the non-ethoxylated oil and water, wherein the first and second fluid jet streams are contacted under a pressure of 25,000-50,000 pounds per square inch (psi) or within a range defined by any two numbers within the range of 25,000-50,000 psi and, wherein after the first and second fluid jet streams are contacted under the pressure, the resultant micro or nano emulsion that comprises the non-ethoxylated oil and water is brought to atmospheric pressure.

Additionally provided are methods of making a bioactive solution that comprises a non-ethoxylated oil, such as macadamia nut oil, and water. Such methods comprise transesterification or saponification of non-ethoxylated oil in the presence of water to generate an ethoxylated oil. The methods further comprise mixing the ethoxylated oil with water to generate the bioactive solution.

Further provided are compositions that find use in the methods described herein. In one aspect, compositions provided herein are bioactive solutions comprising a water-soluble or water-miscible oil and water. In some embodiments, the bioactive solution comprises an ethoxylated oil, such as an ethoxylated macadamia nut oil having 16 ethoxylations per molecule, and water. In other embodiments, the bioactive solutions comprise a micro or nano emulsion derived from a non-ethoxylated oil and water.

In some cases, the sole active ingredient of a composition provided herein, or when performing a method provided herein, can be a bioactive solution described herein (e.g., a bioactive solution containing an ethoxylated oil such as an ethoxylated macadamia nut oil or an ethoxylated castor oil).

BRIEF DESCRIPTION OF THE DRAWINGS

FIGS. 7A-7D are photographs of petunia at 4 days (A and C) and 5 days (B and D) after water stress (meaning: without receiving any water) tested in 2016 (A and B, EMNO Lot #1) and tested in 2017 (C and D, EMNO Lot #2).

DETAILED DESCRIPTION OF THE INVENTION

Figure 1:
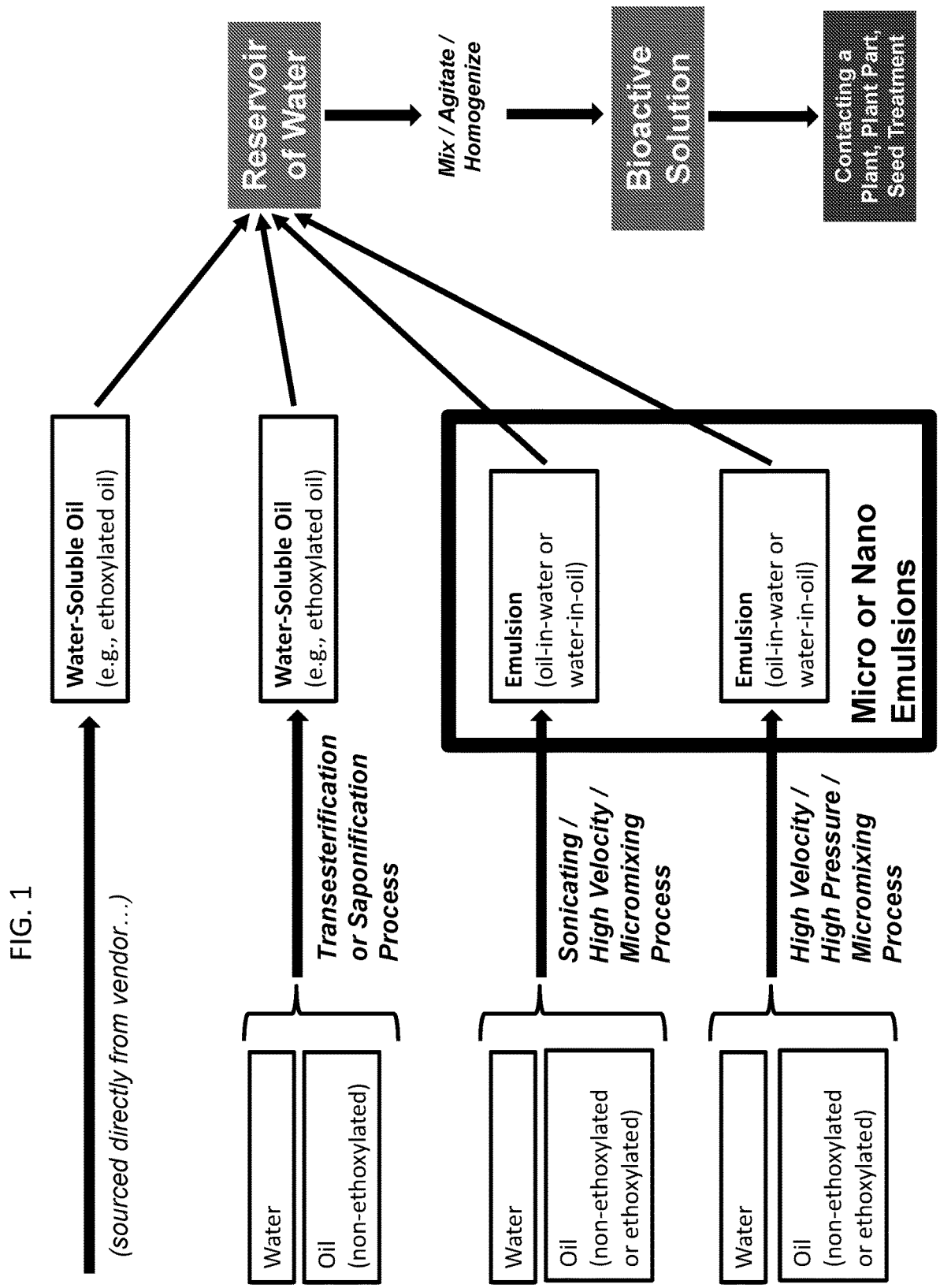
FIG. 1 is a flow diagram illustrating a number of non-limiting approaches for reducing water consumption by plants and/or modifying the growth of plants in accordance with some alternatives of the compositions and methods provided herein.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Overview

Aspects of the present invention are based in part on the discovery by the inventors that certain water-soluble or water-miscible oils, particularly an ethoxylated macadamia nut oil, such as an ethoxylated macadamia nut oil having 16 ethoxylations per molecule, reduces the water consumption of plants and/or modifies the growth of plants when the water soluble or water-miscible oils are mixed with water to create a bioactive solution (e.g., mixed in an emulsion or mixture that creates a bioactive solution), and these bioactive solutions are applied to the soil surrounding plants or applied directly to plants (e.g., stems, leaves or flowers). In some cases, ethoxylated oils can have an average number of ethoxylations per molecule of 10-19.

The compositions and methods described herein can be used to modify the growth of plants, particularly to modify the growth of plants in a manner in which one or more negative or otherwise deleterious effects that are known to occur when plants are subjected to drought stress is/are affected (e.g., minimized or reduced). Such negative or otherwise deleterious effects include, but are not limited to, wilting, yellowing, lodging, a change in turgidity, a change in biomass (e.g., a reduced biomass), a change in agronomic yield (e.g., a reduced agronomic yield), a change in photosynthesis, a change in growth rate (e.g., a reduced growth rate), a change in root weight or length (e.g., a reduced root weight or length), a change in shoot weight or length (e.g., a reduced shoot weight or length), a change in leaf weight or length (e.g., a reduced leaf weight or length), a change in flower or petal production (e.g., a reduced flower or petal production), a change in seed production (e.g., a reduced seed production), a change in bulb production (e.g., a reduced bulb production), a change in fruit production (e.g., a reduced fruit production), a change in salinity tolerance (e.g., a reduced salinity tolerance), and/or a change in water consumed or applied, all when compared to a control plant. For example, the compositions and methods described herein can be used to increase drought tolerance when compared to a control plant, reduce or delay wilting compared to a control plant, reduce or delay yellowing compared to a control plant, reduce or delay lodging compared to a control plant, increase, prolong or maintain turgidity compared to a control plant, increase biomass compared to a control plant, increase agronomic yield compared to a control plant, decrease or increase photosynthesis compared to a control plant, increase or decrease plant or leaf green color compared to a control plant, increase, maintain or decrease chlorophyll content compared to a control plant, reduce or delay a loss in chlorophyll content compared to a control plant, increase or decrease growth rate compared to a control plant, increase or decrease root weight compared to a control plant, increase or decrease root length compared to a control plant, increase or decrease shoot weight compared to a control plant, increase or decrease shoot length compared to a control plant, increase or decrease leaf weight compared to a control plant, increase or decrease leaf length compared to a control plant, increase flower or petal production compared to a control plant, reduce or delay a loss of one or more flowers or petals compared to a control plant, increase or decrease seed production compared to a control seed from a control plant, increase or decrease bulb production compared to a control bulb from a control plant, increase or decrease fruit production compared to a control plant, increase salinity tolerance compared to a control plant, decrease water consumed compared to a control plant, and/or decrease water applied compared to a control plant.

The compositions and methods described herein also can be used to stimulate a plant to grow in certain, desired ways. Such growth stimulation includes, but is not limited to, increased soil surface coverage in the case of turfgrass compared to a control plant, and/or increased dark green color index, when compared to a control plant, which has not been contacted with the bioactive solutions described herein.

Definitions

In the context of this disclosure, a number of terms are used. The following definitions are provided immediately herein below. Other definitions can be found throughout the disclosure. It is understood that the definitions provided herein are the preferred definitions for the purposes of describing the present invention, unless it is stated otherwise herein or apparent from the context of usage.

The term "agricultural plant" or "plant" as used herein is intended to mean any whole plant or cultivar that is grown, cultivated, and/or managed by humans including, but not limited to, plants, bulbs, varieties, strains or races of plants consumed by humans, pets, domestic animals, livestock, farm-raised saltwater and freshwater fish, shrimp, and prawns, plants used to produce, or as a source of, fiber, pharmaceuticals, cosmetics, nutritional supplements, wine, and essential oils, tobacco, marijuana, forest trees, and plants grown by man for aesthetic purposes, such as houseplants, flowers, cut flowers, ornamentals, annuals, perennials, mums, asters, Christmas trees, bedding plants, turfgrasses, ground covers, grasses, shrubs, or shade trees.

The term "cultivar" as used herein refers to a variety, strain, or race of plant that has been produced by horticultural or agronomic techniques and is not normally found in wild populations.

An "agricultural chemical" is any naturally occurring or synthetic chemical or any component thereof that is used in a chemical composition including, but not limited to, fertilizers, insecticides, acaricides, nematicides, fungicides, bactericides, herbicides, plant growth regulators, biostimulants, biopesticides, nutrients, drift reduction agents, utility adjuvants, water conditioners, penetrants, pH buffers, activators, surfactants, stabilizers, preservatives, stickers, spreaders, wetting agents, adjuvants, diluents, detergents, adhesives, anticaking agents, dyes, dispersants, emulsifying agents, defoamers, antimicrobials, antifreeze, pigments, colorants, carriers, or any embodiment of an agricultural chemical found in "Chemistry and Technology of Agrochemical Formulations," edited by D. A. Knowles, copyright 1998 and published by Kluwer Academic Publishers, hereby incorporated by reference.

An "effective concentration of an water-soluble oil" as used herein is intended to mean a concentration of a water-soluble oil, for example, an ethoxylated oil, such as an ethoxylated macadamia nut oil having 16 ethoxylations per molecule, as disclosed herein, which is capable of inducing a reduction in at least one negative effect of drought stress on a plant and/or modifying the growth of a plant using the methods and compositions disclosed herein. In some contexts, water-soluble oil and water-miscible oil are terms used interchangeably. It is recognized that an effective concentration of a water-soluble or water-miscible oil is influenced by a number of factors including, but not limited to, the plant species or subspecies, cultivar, variety, race, or genotype thereof, temperature, light levels, day length, relative humidity, type of soil or growth medium, plant density, soil fertility level, soil pH, or the pH of the bioactive solution, as well as, the application regimen (e.g., single dose or multiple doses at regular intervals) or other components in the bioactive solution in addition to the ethoxylated oil and water, such as, for example, agricultural chemicals, adjuvants, or diluents. By following the disclosure and methods provided herein, one can rapidly determine the effective concentration of a water-soluble or water-miscible oil for the disclosed compositions and applications suitable for any plant.

The terms "drought stress" and "water stress" are equivalent terms in meaning and scope and as used herein are intended to mean stress to a plant that is caused by or results from the soil or other growth medium to have a water content that is less than is needed for optimal growth and development of the plant and causes one or more negative effects to the plant including, but not limited to, wilting, yellowing, lodging, a change in turgidity, a change in biomass, a change in agronomic yield, a change in photosynthesis, a change in growth rate, a change in root weight or length, a change in shoot weight or length, a change in leaf weight or length, a change in flower or petal production, a change in seed production, a change in bulb production, a change in fruit production, a change in salinity tolerance, a change in plant or leaf green color, a change in chlorophyll content, a change in respiration, a change in pollen production, a change in protein content, a change in deoxyribonucleic acid (DNA) and/or ribonucleic acid (RNA) synthesis, and/or a change in cell division.

As used herein, the term "plant parts" includes any part or parts of a whole plant or cultivar including, but not limited to, leaves, flowers, shoots, stems, branches, fruits, vegetables, pods, kernels, seeds, nuts, beans, tubers, ears, cobs, husks, stalks, roots, root tips, anthers, plant cells, plant protoplasts, plant cell tissue cultures from which plants can be regenerated, plant calli, plant clumps, and/or plant cells that are intact in plants or parts of plants such as embryos, pollen, ovules, seeds, nuts, leaves, flowers, shoots, stems, branches, fruits, vegetables, pods, kernels, beans, tubers, ears, cobs, husks, stalks, roots or root tips and the like.

A "control," "control plant," or "control plant part" provides a reference point for measuring changes in the subject plant or subject plant part (e.g., a plant treated with a bioactive solution of the present invention). Typically, the control plant is the same species as the subject plant and preferably, is genetically identical to the subject plant. The control plant is grown in the same or similar conditions as the subject plant and is treated in an identical or substantially the same manner as the subject plant but for the particular treatment applied to the subject plant. For example, a control plant can be exposed to a solution that is identical or essentially identical to a bioactive solution to which a subject plant is exposed except that the solution to which the control plant is exposed lacks the water-soluble or water-miscible oil that is present in the bioactive solution. The control plant is exposed to such solution in the same or essentially the same manner (e.g., same application, timing, duration, and/or volume of solution applied) as a subject plant is exposed to the bioactive solution. Typically, a control plant is watered with irrigation water only and may also be referred to herein as an "untreated plant," "untreated plant part," or "untreated, control plant"; all of which have an equivalent meaning and scope as used herein.

The term "emulsion" as used herein refers to a dispersion of two immiscible liquids, one liquid phase being "dispersed" and the other liquid being "continuous". Generally, this term is used to describe a liquid system comprising particles or micelles having either oily centers (i.e. oil-in-water) or aqueous centers (i.e. water-in-oil). These micelles or particles described herein are preferably less than 5 microns in diameter but greater than 0 microns in diameter. The term "micro emulsion" refers to emulsions comprising micro-sized micelles or particles having a mean or average micelle diameter of 1 micron to 5 microns, e.g., 1.0 microns, 1.5 microns, 2.0 microns, 2.5 microns, 3.0 microns, 3.5 microns, 4.0 microns, 4.5 microns, 5.0 microns, or a number within a range defined by any two of the aforementioned diameters. The term "nano emulsion" refers to emulsions comprising nano-sized micelles or particles having a mean or average micelle diameter that is preferably greater than zero microns but not more than 0.5 microns in diameter (e.g., not more than 0.04 microns in diameter, or not more than 0.01 microns in diameter). Micelle or particle diameter of the micro and nano emulsions prepared by the methods described herein can be determined by a number of suitable techniques and systems. A particular suitable method for determining micelle or particle size/diameter is laser diffraction or dynamic light scattering with instruments manufactured by, for example, Malvern Instruments (Malvern, United Kingdom) and Horiba International (Kyoto, Japan). More information in this regard can be found in, for example, Narang et al. (*Int. J Pharmaceutics* 345 (2007) 9-25).

"Bioactive solution" as used herein is meant to include the combination of either (a) an water-soluble or water-miscible oil and water, or (b) an emulsion and water. One example of a water-soluble oil is an ethoxylated oil, such as an ethoxylated macadamia nut oil having 16 ethoxylations per molecule. Ethoxylated oil can be obtained several ways including, without limitation, sourcing an existing product directly from a vendor or creating it by way of transesterification or saponification. An emulsion can be obtained several ways including, without limitation, creating a micromixture of water and oil by way of sonication and creating a micromixture of water and oil by way of high velocity and high pressure mixing.

The term "water-soluble oil" as used herein is oil that is either (i) soluble in water, in whole or in part, and can be a water-miscible oil such as, for example, an ethoxylated oil that is produced by an ethoxylation process, a transesterification process, or a saponification process and is derived from a plant, plant part, tree, marine, animal, or synthetic source, or (ii) an non-water soluble oil that is not ethoxylated or chemically modified or chemically reacted in any way but is instead solubilized in water by, for example, a micromixing process such as those described herein.

The term "seed treatment" as used herein generally refers to application of bioactive solution to a seed prior to or during the time the seed is planted. Seed treatment with bioactive solution, and agricultural chemicals of the present disclosure, has the advantages of delivering the bioactive solution to the locus at which the seeds are planted shortly before germination of the seed and emergence of a seedling. The seed treatment can be a seed coating applied directly to an untreated and "naked" seed. However, the seed treatment can be a seed overcoat that is applied to a seed that has already been coated with "one or more previous seed coatings or seed treatments". The "one or more previous seed coatings or seed treatments" may include one or more agricultural chemicals.

Description

Compositions for Modifying Plant Growth and/or Reducing Water Consumption by Plants Disclosed herein are compositions and methods for modifying plant growth and/or for reducing water consumption by plants. The methods comprise contacting a plant with a bioactive solution comprising or consisting of a water-soluble oil, e.g., an ethoxylated oil, such as an ethoxylated macadamia nut oil having 16 ethoxylations per molecule, and water; and, optionally, determining or measuring the water consumed by the plant, determining or measuring the water applied to the plant, and/or determining or measuring the visual dehydration in the plant after administration of the bioactive solution by methods disclosed herein or otherwise known in the art. In some cases, ethoxylated oils can have an average number of ethoxylations per molecule of about 10-19. In some cases, the amount of ethoxylated oil in the bioactive solution can be 0.1%, 0.25%, 0.5%, 0.75%, 1%, 1.5%, 2%, 2.5%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% by weight or volume or a percentage that is within a range defined by any two of the aforementioned percentages. For example, the amount of ethoxylated oil in a bioactive solution provided herein can be from about 0.1% to about 25% by weight or volume (e.g., from about 0.1% to about 1%, or from about 0.1% to about 2%, or from about 0.1% to about 4%).

In some cases, the water-soluble oil, e.g., an ethoxylated oil, such as an ethoxylated macadamia nut oil having 16 ethoxylations per molecule, is administered to the plant by adding the ethoxylated oil to a reservoir of water, such as that contained in a container, mixing vessel, mixing tank, mixing kettle, water softener system, water purification system, water filtration system, storage tank, surface water source, snowpack, stream, river, lake, reservoir, well, pond, canal, municipal water source or metering the ethoxylated oil in-line, in real time, to flowing water such as that found in, for example, foliar or overhead sprayers, drench irrigation systems, and/or drip irrigation systems, and/or, mixing the ethoxylated oil with water to create a bioactive solution, and contacting the plant or the surrounding vicinity of the plant with the bioactive solution. In some cases, ethoxylated oils can have an average number of ethoxylations per molecule of about 10-19. In some cases, the amount of ethoxylated oil in the bioactive solution can be 0.1%, 0.25%, 0.5%, 0.75%, 1%, 1.5%, 2%, 2.5%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% by weight or volume or a percentage that is within a range defined by any two of the aforementioned percentages. For example, the amount of ethoxylated oil in a bioactive solution provided herein can be from about 0.1% to about 25% by weight or volume (e.g., from about 0.1% to about 1%, or from about 0.1% to about 2%, or from about 0.1% to about 4%).

In some cases, a bioactive solution comprising or consisting of a water-soluble oil, e.g., an ethoxylated oil, such as an ethoxylated macadamia nut oil having 16 ethoxylations per molecule, and water, is optionally formulated with one or more agricultural chemicals and applied to plants or the surrounding vicinity of plants by any appropriate method including, but not limited to, spraying the bioactive solution on the plants and/or on the soil in the vicinity of the plants using, for example, a self-propelled sprayer vehicle or a sprayer pulled behind a tractor or other farm vehicle or applying via the irrigation system. In some cases, ethoxylated oils can have an average number of ethoxylations per molecule of about 10-19. In some cases, the amount of ethoxylated oil in the bioactive solution is 0.1%, 0.25%, 0.5%, 0.75%, 1%, 1.5%, 2%, 2.5%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% by weight or volume or a percentage that is within a range defined by any two of the aforementioned percentages. For example, the amount of ethoxylated oil in a bioactive solution provided herein can be from about 0.1% to about 25% by weight or volume (e.g., from about 0.1% to about 1%, or from about 0.1% to about 2%, or from about 0.1% to about 4%).

In some cases, a bioactive solution provided herein can be used to prepare a container, mixing vessel, mixing tank, mixing kettle, water softener system, water purification system, water filtration system, or storage tank for use in modifying the growth of a plant and/or reducing the water used by a plant in a desired way as described herein. The methods for preparing a container can optionally comprise selecting a plant or a group of plants such as, for example, plants growing on a farm field, trees growing in an orchard, plants growing in a vineyard, plants growing in one or more pots or other containers in a greenhouse, or turfgrass growing on a golf course, or a commercial, public, or residential lawn, and further comprises providing a container, mixing vessel, mixing tank, mixing kettle, water softener system, water purification system, water filtration system, or storage tank comprising water; and adding to the water in the container, mixing vessel, mixing tank, mixing kettle, water softener system, water purification system, water filtration system, or storage tank a water-soluble oil, such as an ethoxylated oil, or metering said water-soluble oil in-line, in real time, to flowing water, so as to mix the water-soluble oil with water to form an bioactive solution. In some cases, the ethoxylated oil can be macadamia nut oil with 16 ethoxylations per molecule. In some cases, ethoxylated oils can have an average number of ethoxylations per molecule of about 10-19. In some cases, the amount of ethoxylated oil added to water is 0.1%, 0.25%, 0.5%, 0.75%, 1%, 1.5%, 2%, 2.5%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% by weight or volume or a percentage that is within a range defined by any two of the aforementioned percentages. For example, the amount of ethoxylated oil added to water herein can be from about 0.1% to about 25% by weight or volume (e.g., from about 0.1% to about 1%, or from about 0.1% to about 2%, or from about 0.1% to about 4%).

Several embodiments do not depend on a particular type of water-soluble or water-miscible oil. In certain embodiments, the water-soluble or water-miscible oil can be PEG-16 Macadamia Glycerides (commercial name: Florasolvs®

Macadamia-16), PEG-16 Macadamia Glycerides (biobased, 100% renewable origin, sugarcane sourced), Macadamia Seed Oil Polyglyceryl-6 Esters, Macadamia Seed Oil Glycereth-8 Esters, PEG-16 Soy Sterol, PEG-7 Glycerol Cocoate, PEG-10 Soya Sterol, PEG-18 Glyceryl Oleate, PEG-18 Glyceryl Oleate/Cocoate, PEG-24 Hydrogenated Lanolin, PEG-75 Lanolin, PEG-25 Hydrogenated Castor Oil, PEG-200 Hydrogenated Castor Oil, PEG-12 Glyceryl Dioleate, PEG-12 Glyceryl Dimyristate, PEG-23 Glyceryl Palmitate, PEG-12 Glyceryl Distearate, PEG-23 Glyceryl Disterate, PEG-5 Isononanoate, PEG-20 Almond Glycerides, PEG-60 Almond Glycerides, PEG-192 Apricot Kernel Glycerides, PEG-6 Caprylic/Capric Glycerides, PEG-7 Caprylic/Capric Glycerides, PEG-8 Caprylic/Capric Glycerides, PEG-75 Cocoa Butter Glycerides, PEG-3 Glyceryl Cocoate, PEG-7 Glyceryl Cocoate, PEG-30 Glyceryl Cocoate, PEG-40 Glyceryl Cocoate, PEG-80 Glyceryl Cocoate, PEG-18 Palm Glycerides, PEG-20 Hydrogenated Palm Glycerides, PEG-70 Mango Glycerides, PEG-10 Olive Glycerides, PEG-45 Palm Kernel Glycerides, PEG-60 Shea Butter Glycerides, PEG-75 Shea Butter Glycerides, PEG-35 Soy Glycerides, PEG-10 Sunflower Glycerides, PEG-80 Jojoba, PEG-120 Jojoba, PEG-150 Jojoba, PEG-12 Dimethicone, PEG-20, PEG-240, PEG-32/Macrogol 1500, PEG-40, PEG-6/Macrogol 300, PEG-6/Macrogol 400, PEG-75, PEG-80, PEG-150, PEG-6, PEG-8, PEG-12, PEG-200, PEG-300, PEG-400, PEG-600, Dimethicone PEG-8 Meadowfoamate, PEG-75 Meadowfoam Oil, PEG-13 Sunflower Glycerides, PEG-7 Cocoglycerides, Sorbeth-20, PPG-15 Stearyl Ether, PEG-5 Castor Oil, PEG-10 Castor Oil, PEG-15 Castor Oil, PEG-29 Castor Oil, PEG-30 Castor Oil, PEG-32 Castor Oil, PEG-35 Castor Oil, PEG-40 Castor Oil, PEG-7 Hydrogenated Castor Oil, PEG-16 Hydrogenated Castor Oil, PEG-40 Hydrogenated Castor Oil, PEG-60 Hydrogenated Castor Oil, Ceteareth-12, Ceteareth-20, Ceteareth-25, Ceteareth-30, Oleth-5, Oleth-10, Beheneth-10, Steareth-21, C12-C13 Pareth 9, Heptyl Glucoside, Pentylene Glycol, Dimethyl Isosorbide, or Ethoxydiglycol, PEG-10 Laurate, PEG-10 methylether caprate, PEG-10 methylether caprylate, PEG-10 methyl ether caprylate/caprate, PEG-10 methylether cocoate, PEG-10 methyl ether isostearate, PEG-10 methylether laurate, PEG-10 methylether myristate, PEG-10 methylether oleate, PEG-10 methylether palmitate, PEG-10 methylether stearate, PEG-10 Propylene Glycol esters, PEG-10 Sorbitan Laurate, PEG-10 Stearate, PEG-100 methylether caprate, PEG-100 methylether caprylate, PEG-100 methylether caprylate/caprate, PEG-100 methylether cocoate, PEG-100 methylether isostearate, PEG-100 methylether laurate, PEG-100 methylether myristate, PEG-100 methylether oleate, PEG-100 methylether palmitate, PEG-100 methylether stearate, PEG-100 Stearate, PEG-12 Dilaurate, PEG-12 Distearate, PEG-12 Laurate, PEG-12 Stearate, PEG-12 methylether caprate, PEG-12 methylether caprylate, PEG-12 methylether caprylate/caprate, PEG-12 methylether cocoate, PEG-12 methyl ether isostearate, PEG-12 methylether laurate, PEG-12 methylether myristate, PEG-12 methylether oleate, PEG-12 methylether palmitate, PEG-12 methyl ether stearate, PEG-120 Distearate, PEG-120 Methyl Glucose Dioleate, PEG-120 Methyl Glucose Trioleate, PEG-120 Propylene Glycol Stearate, PEG-14 Laurate, PEG-150 Dilaurate, PEG-150 Di stearate, PEG-150 Laurate, PEG-150 Pentaerythrityl Tetrastearate, PEG-16 methylether caprate, PEG-16 methylether caprylate, PEG-16 methylether caprylate/caprate, PEG-16 methylether cocoate, PEG-16 methylether isostearate, PEG-16 methylether laurate, PEG-16 methylether myristate, PEG-16 methylether oleate, PEG-16 methylether palmitate, PEG-16 methylether stearate, PEG-160 Sorbitan Triisostearate, PEG-175 Distearate, PEG-18 Sorbitan Trioleate, PEG-2 Dilaurate, PEG-2 Distearate, PEG-2 Laurate, PEG-2 Sorbitan Isostearate, PEG-2 Stearate, PEG-20 Dilaurate, PEG-20 Distearate, PEG-20 Glycerides, PEG-20 Laurate, PEG-20 methylether caprate, PEG-20 methylether caprylate, PEG-20 methylether caprylate/caprate, PEG-20 methylether cocoate, PEG-20 methylether isostearate, PEG-20 methylether laurate, PEG-20 methylether myri state, PEG-20 methylether oleate, PEG-20 methylether palmitate, PEG-20 methylether stearate, PEG-20 Oleate, PEG-20 Sorbitan Cocoate, PEG-20 Sorbitan Isostearate, PEG-20 Sorbitan Tetraoleate, PEG-20 Sorbitan Triisostearate, PEG-20 Stearate, PEG-200 Glyceryl Stearate, PEG-200 Hydrogenated Glycerides, PEG-200 Hydrogenated Glyceryl Palmate, PEG-200 Laurate, PEG-21 Stearate, PEG-23 Laurate, PEG-25 Hydrogenated Castor Oil, PEG-25 Propylene Glycol Stearate, PEG-3 Caprate, PEG-3 Caprylate, PEG-3 Caprylate/Caprate, PEG-3 Di(Caprylate/Caprate), PEG-3 Dicaprate, PEG-3 Dicaprylate, PEG-3 Dilaurate, PEG-3 Distearate, PEG-3 Ester of C5-C9 Acids, PEG-3 Laurate, PEG-3 Sorbitan Oleate, PEG-3 Sorbitan Stearate, PEG-30 Dipolyhydroxystearate, PEG-30 Glyceryl Cocoate, PEG-30 Glyceryl Stearate, PEG-30 Sorbitan Tetraoleate, PEG-30 Sorbitol Tetraoleate Laurate, PEG-30 Stearate, PEG-32 Dilaurate, PEG-32 Distearate, PEG-32 Laurate, PEG-32 Stearate, PEG-35 Castor Oil, PEG-4 Caprate, PEG-4 Caprylate, PEG-4 Caprylate/Caprate, PEG-4 Di(Caprylate/Caprate), PEG-4 Dicaprate, PEG-4 Dicaprylate, PEG-4 Dierucate, PEG-4 Diheptanoate, PEG-4 Dilaurate, PEG-4 Dioleate, PEG-4 Distearate, PEG-4 Laurate, PEG-4 Olivate, PEG-40 Castor Oil, PEG-40 Distearate, PEG-40 Glyceryl Cocoate, PEG-40 Hydrogenated Castor Oil, PEG-40 methylether caprate, PEG-40 methylether caprylate, PEG-40 methylether caprylate/caprate, PEG-40 methylether cocoate, PEG-40 methylether isostearate, PEG-40 methylether laurate, PEG-40 methylether myristate, PEG-40 methylether oleate, PEG-40 methylether palmitate, PEG-40 methylether stearate, PEG-40 Sorbitan Diisostearate, PEG-40 Sorbitan Hexaoleate, PEG-40 Sorbitan Laurate, PEG-40 Sorbitan Perisostearate, PEG-40 Sorbitan Peroleate, PEG-40 Sorbitan Stearate, PEG-40 Sorbitan Tetraoleate, PEG-40 Stearate, PEG-44 Sorbitan Laurate, PEG-45 Palm Kernel Glycerides, PEG-5 Ethylhexanoate, PEG-5 Glyceryl Stearate, PEG-5 Sorbitan Isostearate, PEG-50 Distearate, PEG-50 Hydrogenated Palmamide, PEG-50 Sorbitan Hexaoleate, PEG-50 Stearate, PEG-55 Propylene Glycol Oleate, PEG-6 Caprate, PEG-6 Caprylate, PEG-6 Caprylate/Caprate, PEG-6 Caprylic/Capric Glycerides, PEG-6 Cocamide, PEG-6 Di(Caprylate/Caprate), PEG-6 Dicaprate, PEG-6 Dicaprylate, PEG-6 Dilaurate, PEG-6 Distearate, PEG-6 Isostearate, PEG-6 Laurate, PEG-6 methylether caprate, PEG-6 methylether caprylate, PEG-6 methylether caprylate/caprate, PEG-6 methylether cocoate, PEG-6 methylether isostearate, PEG-6 methylether laurate, PEG-6 methyl ether myristate, PEG-6 methylether oleate, PEG-6 methylether palmitate, PEG-6 methylether stearate, PEG-6 Sorbitan Oleate, PEG-6 Sorbitan Stearate, PEG-6 Stearate, PEG-60 Almond Glycerides, PEG-60 Glyceryl Isostearate, PEG-60 Hydrogenated Castor Oil, PEG-60 methylether caprate, PEG-60 methylether caprylate, PEG-60 methylether caprylate/caprate, PEG-60 methylether cocoate, PEG-60 methylether isostearate, PEG-60 methylether laurate, PEG-60 methylether myristate, PEG-60 methylether oleate, PEG-60 methylether palmitate, PEG-60 methylether stearate, PEG-60 Sorbitan Stearate, PEG-60 Sorbitan Tetraoleate, PEG-60 Sorbitan Tetrastearate, PEG-60 Sorbitol Tetrastearate, PEG-7 Caprylic/Capric, Glycerides, PEG-7 Glyceryl Cocoate, PEG-7 Hydrogenated Castor Oil, PEG-7 Olivate, PEG-70 Mango Glycerides, PEG-75 Dilaurate, PEG-75 Distearate, PEG-75 Laurate, PEG-75 Propylene Glycol Stearate, PEG-75 Shea Butter Glycerides, PEG-75 Sorbitan Laurate, PEG-75 Stearate, PEG-78 Glyceryl Cocoate, PEG-8 Dicocoate, PEG-8 Dilaurate, PEG-8 Dioleate, PEG-8 Distearate, PEG-8 Isostearate, PEG-8 Laurate, PEG-8 Oleate, PEG-8 Olive Oil Ester, PEG-8 Propylene Glycol Cocoate, PEG-8 Ricinoleate, PEG-8 Stearate, PEG-80 Glyceryl Cocoate, PEG-80 Sorbitan Laurate, PEG-80 Sorbitan Palmitate, PEG-9 Distearate, PEG-9 Laurate, PEG-90 Glyceryl Isostearate, Polysorbate-20, Polysorbate-60, and Polysorbate-80 or a mixture of any two or more of the aforementioned water-soluble or water-miscible oils. In certain embodiments of the methods and compositions herein, the water-soluble or water-miscible oil is PEG-16 Macadamia Glycerides.

In some cases, a micro or nano emulsion that includes a non-water-soluble oil and water can be made and used as described herein. For example, a micro or nano emulsion that includes a non-water soluble oil and water can be made by sonicating a first fluid jet stream including a non-water-soluble oil and a second fluid jet stream including water, wherein the sonicating is performed by positioning a tip of a sonication probe within a gap defined between a first fluid jet which emits the first fluid jet stream, and a second fluid jet which emits the second fluid jet stream, positioned such that the fluid jet streams from the first fluid jet and the second fluid jet impinge in the gap creating a point of high turbulence at the point of impact of the fluid jet streams, with each of the fluid jet streams having sufficient linear velocity to achieve high intensity micromixing of the non-water-soluble oil and water, and the sonication probe providing ultrasonic energy in the immediate vicinity of the impinging fluid jet streams thereby generating the micro or nano emulsion that comprises the non-water-soluble oil and water. In some cases, the non-water-soluble oil can be macadamia nut oil. Other non-water-soluble oils or fatty acids, which can be used in the methods described herein include, but are not limited to, fatty alcohol, oleic acid, palmitoleic acid, apricot kernel oil, avocado oil, evening primrose oil, grape seed oil, hazelnut oil, pumpkinseed oil, rosehip oil, safflower oil, sunflower oil, walnut oil, wheat germ oil, neem oil, mink oil, lanolin, argan oil, abyssinian oil, *Salvia hispanica* oil (chia seed oil), *Calophyllum tacamahaca* seed oil (tamanu oil), squalane, sea buckthorn oil, meadowfoam oil, castor oil, jojoba oil, olive oil, corn oil, sesame oil, *Oenocarpus bataua* oil, *Pentaclethra macroloba* oil, or emu oil.

Methods for Reducing Water Consumption by a Plant and for Modifying the Growth of a Plant The present invention also provides methods for reducing water consumption by plants and for affecting the growth of plants, particularly agricultural plants. The availability of freshwater for crop production and for growing plants for aesthetic purposes is known to be decreasing. Moreover, managing the growth of a plant can be beneficial to the farmer, viticulturist, or grower. The methods and compositions described herein can be used to reduce water consumption by plants and/or to affect in a desired way the growth of a plant, particularly agricultural plants and plants grown for aesthetic purposes such as, for example, turfgrasses and ornamental plants such as, for example, flowers, annuals, mums, and perennials. Because plants require a sufficient level of water to be available for optimal growth and development, drought stress (or lack of sufficient water) can negatively affect or otherwise adversely impact any aspect of plant growth and development as well as the various underlying physiological processes required for plant growth and development. Negative effects of drought stress include, but are not limited to, wilting, yellowing, lodging, a change in turgidity, a change in biomass, a change in agronomic yield, a change in photosynthesis, a change in growth rate, a change in root weight or length, a change in shoot weight or length, a change in leaf weight or length, a change in salinity tolerance, a change in plant or leaf green color, a change in chlorophyll content, a change in respiration, a change in pollen production, a change in protein content, a change in deoxyribonucleic acid (DNA) and/or ribonucleic acid (RNA) synthesis, a change in cell division, a change in flower or petal production (e.g., a decrease in flower or petal number per plant and/or flower or petal size), a change in seed production (e.g., a decrease in seed number per plant and/or seed size or weight), a change in bulb production (e.g., a decrease in bulb size or weight), a change in fruit production (e.g., a decrease in fruit number per plant and/or fruit size or weight), a change in plant quality and/or appearance, a change in fruit quality, and a change in flower quality and/or appearance.

The methods for reducing water consumption and the methods for modifying plant growth described herein can comprise contacting a plant with a bioactive solution comprising a water-soluble oil, for example, an ethoxylated oil, such as an ethoxylated macadamia nut oil having 16 ethoxylations per molecule, and water. In some cases, ethoxylated oils can have an average number of ethoxylations per molecule of about 10-19. The plants can be contacted with the bioactive solution using any appropriate method for applying irrigation water and/or agricultural chemicals to plants, plant parts, seed treatments, or to the vicinity surrounding the plants, plant parts or seed treatments. In some embodiments, a bioactive solution provided herein is applied to the soil in the vicinity of a plant growing outdoors in a field, whereby the plant's roots are contacted with the bioactive solution as it enters and migrates through soil. In such embodiments, the bioactive solution can be applied to the soil surface or injected into the soil at a depth where the plant's roots are expected to be.

In some embodiments, a bioactive solution provided herein is applied to either the soil or other growth medium in the vicinity of the plant, plant parts or seed treatments and also to above-ground portions of plants, plant parts or seed treatments. In other embodiments, a bioactive solution provided herein is sprayed on the above-ground portions of the plant using hand-held sprayers, backpack sprayers, sprayers pulled behind tractors, self-propelled sprayers, crop-dusting aircraft or the irrigation system itself (e.g, spray irrigation, drip irrigation, or flood irrigation). It is recognized that when a bioactive solution provided herein is applied by any of such application methods, a portion of the bioactive solution will typically be applied to the surface of the soil or growth medium in the vicinity of the plant.

In exemplary embodiments of the methods and compositions of the present invention, reducing water consumption comprises the application of a lesser volume of water to the plant, plant part or seed treatment contacted with the bioactive solution to maintain a desired level or an amount of at least one growth parameter or characteristic relative to the control volume of water applied to the control plant, control plant part, or control seed treatment that is required to maintain the desired level or amount of the at least one growth parameter or characteristic. Such growth parameters or characteristics include, for example but not limitation, turgidity, plant color, leaf color, biomass, agronomic yield, photosynthesis, growth rate, root weight, root length, shoot weight, shoot length, leaf weight, leaf length, flower production, seed production, bulb production, fruit production, vegetable production, soil surface coverage, and dark green color index. Additional growth parameters or characteristics are described herein.

In some cases, the methods of the present invention can be used to save not only water but also the costs of purchasing or otherwise obtaining and applying the additional water to the plants, plant parts or seed treatments that would have been required had the plant, plant part or seed treatment not been contacted with a bioactive solution provided herein. In some cases, the volume of water that is applied to the plant, plant part or seed treatment contacted with the bioactive solution (i.e. "the lesser volume") is at least about 1%, 2%, 5%, 10%, 15%, 20%, 25%, 30%, 35%, or 40% less than the volume of water that is applied to a control plant, control plant part or control seed treatment. In some cases, the lesser volume is at least about 45%, 50%, 55%, 60%, 65%, 70%, 75%, 80%, 90%, or 95% less than the control volume needed to achieve the same result in control plants, control plant parts or control seed treatments.

In other embodiments, a plant treated as described herein can be a plant that is growing in a pot outdoors at a plant nursery or in a greenhouse or other controlled-environment, plant growth facility. In some embodiments, a bioactive solution provided herein is applied to the growth medium of the pot in which the plant is growing. The methods described herein do not depend on a particular growth medium. Any appropriate growth medium can be used in the methods disclosed herein including, but not limited to, soil, growth media comprising soil and other non-soil components, and soil-free growth media that comprise non-soil components but do not contain soil. Such non-soil components include, but are not limited to, shredded bark, bark chips, particles or fines, peat moss, vermiculite, perlite, expanded slate lightweight aggregate, agar, and sand.

In some embodiments, a plant treated as described herein can be a plant that is grown hydroponically, and a bioactive solution described herein is applied to the plant in the same manner as the nutrient solution. In some cases, the bioactive solution comprises the water-soluble oil, water and all or a portion of the nutrients and other components in the nutrient solution used for growing the plants hydroponically. The bioactive solution can replace, in whole or in part for example, the nutrient solution entirely during the period the plant is grown under hydroponic conditions or on occasion for a certain period of time, or on multiple occasions, each for a certain period of time.

The methods described herein can include contacting a plant with a bioactive solution described herein. As used herein, the term "contacting" is not intended to limit the methods to a single application of the bioactive solution to the plant or to the soil or other growth medium in the vicinity of the plant. The "contacting" can comprise, for example, a single application, or multiple applications or continuous application as in the case of a plant grown in hydroponic culture. Thus, the bioactive solution can be applied to a plant, plant part or seed treatment 1, 2, 3, 4, 5, 6, 7, 8, 9, 10 or more times during a growing season, the plant's life cycle, or within a range defined by any two of the aforementioned times. For example, the bioactive solution can be applied to a plant, plant part or seed treatment from about 1 to about 1,000 times during a growing season.

In one aspect, the methods for reducing water consumption and the methods for modifying the growth of a plant with a bioactive solution comprises using a water-soluble oil and water or a micro or nano emulsion and water (FIG. 1).

In some cases, the micro or nano emulsion comprises a non-water-soluble oil and water. In some cases, the micro or nano emulsion comprises a water-soluble oil and water. In some cases, the water-soluble oil that is used in the methods described herein is an ethoxylated plant, plant part, tree, marine, animal, or synthetic oil or fatty acid, fatty alcohol, or fatty amine (e.g., an ethoxylated macadamia nut oil having 16 ethoxylations per molecule). In some cases, ethoxylated oils can have an average number of ethoxylations per molecule of about 10-19. In some cases, the ethoxylated oil comprises or consists of an unsaturated fatty acid. In some cases, ethoxylated oils can be obtained or created from, for example, fatty alcohol, oleic acid, palmitoleic acid, apricot kernel oil, avocado oil, evening primrose oil, grape seed oil, hazelnut oil, pumpkinseed oil, rosehip oil, safflower oil, sunflower oil, walnut oil, wheat germ oil, neem oil, mink oil, lanolin, argan oil, abyssinian oil, *Salvia hispanica* oil (chia seed oil), *Calophyllum tacamahaca* seed oil (tamanu oil), squalane, sea buckthorn oil, castor oil, olive oil, corn oil, sesame oil, or emu oil. In some cases, an oil used herein can be a macadamia nut oil, jojoba oil, *Oenocarpus bataua* oil, *Pentaclethra macroloba* oil, or meadowfoam oil, or any combination thereof. In some cases, an ethoxylated oil used in the methods described herein is obtained or created from macadamia nut oil. In one alternative, the ethoxylated oil can be obtained from macadamia nut oil with an average of 16 ethoxylations per molecule. An example of such an ethoxylated macadamia nut oil with an average of 16 ethoxylations per molecule that is used in the methods and compositions described herein is PEG-16 Macadamia Glycerides (The HallStar Company, Chicago, IL, USA). In some cases, the amount of non-ethoxylated macadamia nut oil or ethoxylated macadamia nut oil in the bioactive solution is 0.1%, 0.25%, 0.5%, 0.75%, 1%, 1.5%, 2%, 2.5%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% by weight or volume or an amount that is within a range defined by any two of the aforementioned amounts. For example, the amount of non-ethoxylated macadamia nut oil or ethoxylated macadamia nut oil in the bioactive solution can be from about 0.1% to about 25% by weight or volume (e.g., from about 0.1% to about 1%, or from about 0.1% to about 2%, or from about 0.1% to about 4%).

Depending on the intended applications, the amount of water-soluble oil(s) in a bioactive solution or micro or nano emulsion suitable for the methods described herein vary. For example, in some cases, the methods for modifying the growth of a plant utilize a bioactive solution or micro or nano emulsion comprising from about 0.01% to about 50% by weight or volume water-soluble oil(s). That is, some alternatives of the methods described herein comprise contacting a plant or the area in the vicinity of a plant with a bioactive solution or micro or nano emulsion containing less than or equal to (but not zero) 0.01%, 0.025%, 0.05%, 0.075%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.25%, 1.5%, 1.75%, 2.0%, 2.25%, 2.5%, 2.75%, 3.0%, 3.25%, 3.5%, 3.75%, 4.0%, 4.25%, 4.5%, 4.75%, 5.0%, 5.25%, 5.5%, 5.75%, 6.0%, 6.25%, 6.5%, 6.75%, 7.0%, 7.25%, 7.5%, 7.75%, 8.0% 8.25%, 8.5%, 8.75%, 9.0%, 9.25%, 9.5%, 9.75%, 10.0%, 10.25%, 10.5%, 10.75%, 11.0%, 11.25%, 11.5%, 11.75%, 12.0%, 12.25%, 12.5%, 12.75%, 13.0%, 13.25%, 13.5%, 13.75%, 14.0%, 14.25%, 14.5%, 14.75%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, or 50.0% water-soluble oil(s) by weight or volume or an amount within a range defined by any two of the aforementioned amounts. For example, the amount of water-soluble oil(s) in the bioactive solution or micro or nano emulsion can be from about 0.01% to about 50% by weight or volume (e.g., from about 0.01% to about 1%, or from about 0.01% to about 2%, or from about 0.01% to about 4%). In some cases, the amount of water-soluble oil in the bioactive solution or micro or nano emulsion is 0.1%, 0.25%, 0.5%, 0.75%, 1%, 1.5%, 2%, 2.5%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% by weight or volume or an amount that is within a range defined by any two of the aforementioned amounts. For example, the amount of water-soluble oil in the bioactive solution or micro or nano emulsion can be from about 0.1% to about 25% by weight or volume (e.g., from about 0.1% to about 1%, or from about 0.1% to about 2%, or from about 0.1% to about 4%). In some cases, the amount of water-soluble oil in the bioactive solution is about 4%, the amount of water-soluble oil in the bioactive solution is about 2%, or the amount of water-soluble oil in the bioactive solution is about 1%.

In some embodiments, the water-soluble oil itself or the bioactive solution is further formulated with or into one or more agricultural chemicals. Such agricultural chemicals can act as a carrier to conveniently apply the water-soluble oil or bioactive solution to plants, plant parts or seed treatments or in the vicinity of plants, plant parts or seed treatments in order to modify plant growth and reduce water consumption by plants as described herein. "Agricultural chemicals" include any naturally occurring or synthetic chemical or any component thereof that is used in a chemical composition including, but not limited to, fertilizers, insecticides, acaricides, nematicides, fungicides, bactericides, herbicides, plant growth regulators, biostimulants, biopesticides, nutrients, drift reduction agents, utility adjuvants, water conditioners, penetrants, pH buffers, activators, surfactants, stabilizers, preservatives, stickers, spreaders, wetting agents, adjuvants, diluents, detergents, adhesives, anti-caking agents, dyes, dispersants, emulsifying agents, defoamers, antimicrobials, antifreeze, pigments, colorants, carriers, or any embodiment of an agricultural chemical found in "Chemistry and Technology of Agrochemical Formulations," edited by D. A. Knowles, copyright 1998 and published by Kluwer Academic Publishers, hereby incorporated by reference.

In some embodiments, the methods for reducing water consumption comprise determining or measuring the amount of water consumed by or applied to a plant or plants contacted with a bioactive solution described herein when compared to a control plant or plants that is/are maintained at the same hydration level as the plant or plants contacted with the bioactive solution. Any appropriate method for determining or measuring water consumption or water application can be used in these methods. In certain embodiments, water consumption is determined or measured essentially as described in Example 2 herein.

In some embodiments, the methods for modifying or otherwise affecting the growth of a plant in a desired way comprise determining or measuring in a plant or plants contacted with a bioactive solution described herein one or more growth parameters or characteristics of interest and optionally determining or measuring the same one or more growth parameters or characteristics in a control plant or plants. Determining or measuring the one or more growth parameters or characteristics of interest in a plant can comprise, for example, determining fresh weights and/or dry weights of the plant, plant part or seed treatment, determining the water content of the plant, plant part or seed treatment, measuring plant height, determining agronomic yield, determining biomass, determining root length, determining root fresh weight, determining root dry weight, and measuring photosynthesis. Methods for determining or measuring such plant growth parameters or characteristics are disclosed herein or otherwise known in the art.

The methods described herein for reducing water consumption by plants and/or for modifying the growth of plants are useful with any appropriate plant of interest, particularly any appropriate agriculture plant of interest. The methods can be used with any appropriate plant species, including, but not limited to, monocots, dicots, gymnosperms, or ferns. Examples of plant species on which the methods described herein can be applied include, but are not limited to, maize or corn (*Zea mays*), *Brassica* sp. (e.g., *B. napus, B. rapa*, or *B. juncea*), particularly those *Brassica* species useful as sources of seed oil, alfalfa (*Medicago sativa*), rice (*Oryza sativa*), rye (*Secale cereale*), sorghum (*Sorghum bicolor, Sorghum vulgare*), Sudangrass (*Sorghum bicolor* ssp. *drummondii*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Coffea* spp.), coconut (*Cocos mucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), hops (*Humulus lupulus*), oats, spices, herbs, edible flowers, algae, rapeseed, triticale, buckwheat, fonio, quinoa, or barley, or other fruits, vegetables, or ornamentals, or plants grown for aesthetic purposes, perennials, conifers, or marijuana.

Other plants of interest on which the methods described herein can be applied include, for example but not limitation, vegetable plants, fruit tree plants, and berry bushes and vines including, but not limited to, tomatoes (*Lycopersicon esculentum*), lettuce (e.g., *Lactuca sativa*), green beans (*Phaseolus vulgaris*), lima beans (*Phaseolus limensis*), butter beans, kidney beans (*Phaseolus vulgaris*), yam beans, jicama, peas (*Lathyrus* spp.), cowpea (*Vigna unguiculata*), members of the genus *Cucumis* such as, for example, cucumber (*C. sativus*), cantaloupe (*C. cantalupensis*), musk melon (*C. melo*), or watermelon, beans, kale, spinach, peppers, artichoke, radish, potatoes, oranges, lemons, grapefruit, limes, fruit trees, fruit bushes such as, for example, blueberries, raspberries, blackberries, strawberries, or other berries, and grapes (e.g. *Vitus vinifera, V. labrusca., V. riparia., V. rotundifolia, V. rupestris, V. aestivalis*, or *Vitus* interspecific hybrids).

Ornamentals on which the methods described herein can be applied include, but are not limited to, azalea (*Rhododendron* spp.), hydrangea (*Macrophylla hydrangea*), hibiscus (*Hibiscus rosasanensis*), rose (*Rosa* spp.), tulip (*Tulipa* spp.), daffodil (*Narcissus* spp.), petunia (*Petunia×atkinsiana*, synonym: *Petunia×hybrid; Petunia nana; Petunia* spp.), pansy (*Viola tricolor; Viola×wittrockiana; Viola* spp.) carnation (*Dianthus caryophyllus*), poinsettia (*Euphorbia pulcherrima*), or chrysanthemum.

Perennials on which the methods described herein can be applied include, but are not limited to, balloon flower (*Platycodon grandiflorus*), black-eyed Susan (*Rudbeckia fulgida* var. *sullivantii*), bleeding-heart (*Dicentra spectabilis*), butterfly-weed (*Asclepias tuberosa*), daylily (*Hemerocallis* spp.), iris (*Iris* spp.), lilly (*Lilly* spp.), lavender (*Lavendula angustifolia*), lily-of-the-alley (*Convallaria majalis*), peony (*Paeonia Iactiflora*), coneflower (*Echinacea* spp.), or Shasta daisy (*Leucanthemum×superbum*).

Conifers on which the methods described herein can be applied include, for example but not limitation, pines such as loblolly pine (*Pinus taeda*), slash pine (*Pinus elliotii*), ponderosa pine (*Pinus ponderosa*), lodgepole pine (*Pinus contorta*), Virginia pine (*Pinus virginiana*), white pine (*Pinus strobus*), or Monterey pine (*Pinus radiata*); Douglas fir (*Pseudotsuga menziesii*); Western hemlock (*Tsuga canadensis*); Sitka spruce (*Picea glauca*); or redwood (*Sequoia sempervirens*); true firs such as silver fir (*Abies amabilis*), balsam fir (*Abies balsamea*), or Frasier fir (*Abies fraseri*); or cedars such as Western red cedar (*Thuja plicata*) or Alaska yellow-cedar (*Chamaecyparis nootkatensis*).

Marijuana on which the methods described herein can be applied include, without limitation, cannabis varieties whether sativa, indica, ruderalis, or hybrid strains.

The methods described herein also can be practiced on species of grasses, including, but not limited to, turfgrasses used for pastures, meadows, farms, lawns, parks, recreational areas, golf courses, golf driving ranges, horse tracks, tennis courts, cemeteries, or athletic fields used for sports such as, for example, American football, soccer, baseball, softball, cricket, rugby, or polo. Turfgrasses are typically characterized as cool-season turfgrasses or warm-season turfgrasses. Examples of cool-season turfgrasses that can be used in the methods described herein by way of illustration, but not limitation, are bluegrasses (*Poa* spp.), such as Kentucky bluegrass (*Poa pratensis*), rough bluegrass (*Poa trivialis*), Canada bluegrass (*Poa compressa*), annual bluegrass (*Poa annua*), upland bluegrass (*Poa glaucantha*), wood bluegrass (*Poa nemoralis*), or bulbous bluegrass (*Poa bulbosa*); the bentgrasses or redtop (*Agrostis* spp.), such as creeping bentgrass (*Agrostis palustris*), colonial bentgrass (*Agrostis tenuis*), velvet bentgrass (*Agrostis canina*), South German Mixed Bentgrass (*Agrostis* spp. including *Agrostis tenius, Agrostis canina*, or *Agrostis palustris*), or redtop (*Agrostis alba*); the fescues (*Festuca* spp.), such as red fescue (*Festuca rubra; Festuca rubra* var. *rubra*), chewings fescue (*Festuca rubra commutata*.), sheep fescue (*Festuca ovina*), hard fescue (*Festuca longifolia*), hair fescue (*Festuca capillata*), tall fescue (*Festuca arundinacea*), or meadow fescue (*Festuca elanor*); the ryegrasses (*Lolium* spp.), such as annual ryegrass (*Lolium multiflorum*), perennial ryegrass (*Lolium perenne*), or italian ryegrass (*Lolium multiflorum*); or the wheatgrasses (*Agropyron* spp.), such as fairway wheatgrass (*Agropyron cristatum*), crested wheatgrass (*Agropyron desertorum*), or western wheatgrass (*Agropyron smithii*). Other cool-season turfgrasses on which the methods described herein can be applied include, but are not limited to, beachgrass (*Ammophila breviliguata*), smooth bromegrass (*Bromus inermis*), cattails such as Timothy (*Phleum pratense*), sand cattail (*Phleum subulatum*), orchardgrass (*Dactylis glomerata*), weeping alkaligrass (*Puccinellia distans*) or crested dog's-tail (*Cynosurus cristatus*). Examples of warm-season turfgrasses on which the methods described herein can be applied include, but are not limited to, Bermudagrass (*Cynodon* spp.), zoysiagrass (*Zoysia* spp.), St. Augustine grass (*Stenotaphrum secundatum*), centipedegrass (*Eremochloa ophiuroides*), carpetgrass (*Axonopus affinis*), Bahia grass (*Paspalum notatum*), Kikuyugrass (*Pennisetum clandestinum*), buffalo grass (*Buchloe dactyloids*), Blue gramma (*Bouteloua gracilis*), seashore paspalum (*Paspalum vaginatum*) or sideoats grama (*Bouteloua curtipendula*). The methods of the present invention can be used with turfgrass lawns, stands, sod, or other plantings comprising a single turfgrass species or a mixture of two, three, four, or more turfgrass species, including, but not limited to, a mixture of two, three, four, or more of the aforementioned turfgrass species.

In some cases, plants on which the methods described herein can be applied include crop plants. Examples of crop plants on which the methods described herein can be applied include, but are not limited to, grain plants (e.g., maize, wheat, rice, oat, barley, rye, or millet) or oilseed plants (e.g., oil palm, coconut, olive, soybean, canola, sunflower, safflower, cotton, peanut, sesame, or flax), forage plants (e.g., alfalfa), fiber plants (e.g., cotton, flax), fruit trees (e.g., apple, pear, peach, plum, cherry, orange, grapefruit, lemon, lime, or avocado), nut trees (e.g., almond, cashew, English walnut, pecan, pistachio, or hazelnut), berries (e.g., strawberry, raspberry, black berry, blueberry, cranberry, grape, or lingonberry), sugarcane, sugar beets, or vegetable plants (e.g., lettuce, potato, tomato, pepper, eggplant, sweet potato, cassava, squash, pumpkin, onion, carrot, celery, cabbage, cauliflower, broccoli, or garden beet). Such non-solanaceous crop plants on which the methods described herein can be applied include, but are not limited to, cotton, soybean, maize, wheat, rice, oat, barley, sorghum, cabbage, cauliflower, broccoli, sweet potato, lettuce, apple, citrus, strawberry, banana, sugarcane, or palm. Other plants on which the methods described herein can be applied are forage plants, fruit trees, nut trees, turfgrasses, houseplants, bedding plants, or landscape plants.

In certain embodiments, the plants on which the methods described herein can be applied include ones in which a part or parts of the plant are sold commercially including, but not limited to, Christmas trees, bulbs or flowers (e.g., roses, carnations, poinsettias, daisies, daffodils, tulips, or chrysanthemums). It is recognized that for such plants, the bioactive solution can be contacted with the intact plant or soil surrounding the plant before the desired part or parts are harvested. Alternatively or additionally, the desired part or parts can be contacted with a bioactive solution provided herein after harvest by any of the methods of contacting described herein. In certain embodiments, the cut end of a Christmas tree, or the cut end of a flower stalk or pedicle to which the cut flower is attached, can be immersed in a bioactive solution provided herein.

Methods for the Preparation of a Reservoir of Water to Create a Bioactive Solution Some alternatives disclosed herein relate to methods for preparing a reservoir of water for use in the described methods for reducing water consumption and/or for modifying or otherwise affecting the growth of a plant. The methods for preparing a reservoir of water comprise adding to the water a water-soluble or water-miscible oil or a micro or nano emulsion to then form a bioactive solution (FIG. 1).

Any appropriately configured reservoir of water will suffice in order to practice the methods described herein. In this regard, the term "reservoir" as used herein refers to any appropriate body or source of water that may be used in conjunction with a method for reducing water consumption and/or for modifying the growth of a plant. Such a reservoir can, for example but not limitation, also be an appropriate body or source of water found in a surface water source, snowpack, stream, river, lake, reservoir, well, pond, canal or municipal water source, or water held in a tank or a container having an appropriate configuration for the purpose of being applied to plants or the soil in the vicinity of a plant.

In some cases, the reservoir of water is a container, a mixing vessel, a mixing tank, or a mixing kettle. In some alternatives, the reservoir of water is a water softener system, a water purification system, a water filtration system, or an irrigation system. In some alternatives, the reservoir of water is a storage tank or a watering can. In some embodiments, the reservoir is a container that affixes to a hose such that the water-soluble or water-miscible oil (e.g., an ethoxylated oil having 10-19 ethoxylations per molecule, such as a macadamia nut oil having 16 ethoxylations per molecule) is metered into the flow of water from the hose at a rate that promotes improved plant growth and/or reduced water consumption by a plant.

In some cases, the methods described herein comprise selecting a plant to be contacted with a bioactive solution described herein, providing a reservoir of water, and adding to the water a water-soluble oil or a micro or nano emulsion to form a bioactive solution (e.g., an ethoxylated oil having 10-19 ethoxylations per molecule, such as a macadamia nut oil having 16 ethoxylations per molecule). In some cases, the water-soluble oil or micro or nano emulsion can be added to stagnant, sprayed or flowing water. Accordingly, in some alternatives of the methods described herein, the water-soluble oil or micro or nano emulsion (e.g., an ethoxylated oil having 10-19 ethoxylations per molecule, such as a macadamia nut oil having 16 ethoxylations per molecule) is added to a stagnant body of water and then mixed or agitated to form a bioactive solution. In some alternatives, adding a water-soluble oil comprises metering the water-soluble oil in-line, in real time, to sprayed or flowing water and mixing or agitating the water-soluble oil (e.g., an ethoxylated oil having 10-19 ethoxylations per molecule, such as a macadamia nut oil having 16 ethoxylations per molecule) with the water so as to form a sprayable or flowing bioactive solution. In some alternatives, adding a micro or nano emulsion comprises metering the micro or nano emulsion in-line, in real time, to sprayed or flowing water and mixing or agitating the micro or nano emulsion with the water so as to form a sprayable or flowing bioactive solution.

In some alternatives of the methods described herein, the water-soluble oil can be derived from a plant, plant part, tree, marine, animal, or synthetic source, or from fatty acid, fatty alcohol, or fatty amine. In some alternatives, the fatty acid is unsaturated fatty acid. In some alternatives, the water-soluble oil that is used in the methods described herein is obtained or created from ethoxylated macadamia nut oil. In some cases, the ethoxylated oil has an average number of ethoxylations per molecule that is 10, 11, 12, 13, 14, 15, 16, 17, 18, or 19 or an average number of ethoxylations per molecule that is within a range defined by any two of the aforementioned values. For example, the ethoxylated oil has an average number of ethoxylations per molecule from about 10 to about 19 (e.g., from about 10 to about 12, or from about 10 to about 14, or from about 10 to about 16). In some cases, the ethoxylated oil can be obtained from macadamia nut oil with 16 ethoxylations per molecule.

Depending on the intended applications, the amount of ethoxylated oil(s) suitable for the methods described herein can vary. For example, in some alternatives, the methods for preparing a reservoir of water described herein can comprise a bioactive solution described herein that comprises from about 0.01% to about 50% by weight or volume of ethoxylated oil(s) and water. That is, some alternatives of the methods described herein can comprise a bioactive solution containing less than (but not zero) or equal to 0.01%, 0.025%, 0.05%, 0.075%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.25%, 1.5%, 1.75%, 2.0%, 2.25%, 2.5%, 2.75%, 3.0%, 3.25%, 3.5%, 3.75%, 4.0%, 4.25%, 4.5%, 4.75%, 5.0%, 5.25%, 5.5%, 5.75%, 6.0%, 6.25%, 6.5%, 6.75%, 7.0%, 7.25%, 7.5%, 7.75%, 8.0% 8.25%, 8.5%, 8.75%, 9.0%, 9.25%, 9.5%, 9.75%, 10.0%, 10.25%, 10.5%, 10.75%, 11.0%, 11.25%, 11.5%, 11.75%, 12.0%, 12.25%, 12.5%, 12.75%, 13.0%, 13.25%, 13.5%, 13.75%, 14.0%, 14.25%, 14.5%, 14.75%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, or 50.0% ethoxylated oil(s) by weight or volume or an amount that is within a range defined by any two of the aforementioned amounts. For example, the amount of ethoxylated oil(s) in the bioactive solution can be from about 0.01% to about 50% by weight or volume (e.g., from about 0.01% to about 1%, or from about 0.01% to about 2%, or from about 0.01% to about 4%). In some cases, the amount of ethoxylated oil in a bioactive solution can be 0.1%, 0.25%, 0.5%, 0.75%, 1%, 1.5%, 2%, 2.5%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% by weight or volume or an amount that is within a range defined by any two of the aforementioned amounts. For example, the amount of ethoxylated oil in the bioactive solution can be from about 0.1% to about 25% by weight or volume (e.g., from about 0.1% to about 1%, or from about 0.1% to about 2%, or from about 0.1% to about 4%). In some cases, the amount of ethoxylated oil in the bioactive solution is about 1%, the amount of ethoxylated oil in the bioactive solution is about 2%, or the amount of ethoxylated oil in the bioactive solution is about 4%.

In some cases, additional agents can be added to the reservoir of water described herein. For example, agents that can be added include, but are not limited to, humectants such as glycerin, glycols, or sorbitol; synthetic oils such as mineral oil or petrolatum; natural oils such as jojoba oil, sunflower oil, or safflower oil; silicones such as dimethicone or cyclomethicone; esters such as isopropyl palmitate or caprylic or capric triglyceride; butters such as coffee butter, cocoa butter, or shea butter; skin barrier ingredients such as ceramides or fatty acids including unsaturated fatty acids, fatty alcohols, or waxes. In some alternatives, dextrans, cyclodextrins, hyaluronic acid and/or urea are also added to the reservoir of water in addition to the water-soluble oil (e.g., an ethoxylated oil having 10-19 ethoxylations per molecule, such as a macadamia nut oil having 16 ethoxylations per molecule).

In some alternatives, the bioactive solution is further formulated with or into or otherwise comprises one or more agricultural chemicals or any component thereof that are described herein. Such agricultural chemicals can act as a carrier to conveniently apply the bioactive solution to plants, plant parts or seed treatments or in the vicinity of plants, plant parts or seed treatments in order to modify plant growth and/or reduce water consumption by plants as described herein.

In some alternatives, the bioactive solution is further formulated into dissolvable beads with different dissolution rates to provide for longer term delivery, stability, and/or reduction of oxidation of the oil or emulsion used in a bioactive solution. Such beads are then applied to a reservoir of water that is then prepared for application to plants, or mixed directly into the soil as a soil amendment in order to modify or otherwise affect the growth of plants and/or reduce water consumption of plants. Such beads can be encapsulating beads such that the water-soluble oil (e.g., an ethoxylated oil having 10-19 ethoxylations per molecule, such as a macadamia nut oil having 16 ethoxylations per molecule) or the micro or nano emulsion is encapsulated within a shell of the bead, wherein said shell is comprised, for example, of a sugar, dextran, cyclodextrin, or wax.

In another aspect, as also illustrated in FIG. 1, some alternatives of the present disclosure relate to methods of making a bioactive solution that comprises a non-water-soluble oil and water including: transesterification or saponification of a non-water-soluble oil in the presence of water to generate an ethoxylated oil; and mixing the resulting ethoxylated oil with water to create a bioactive solution.

Methods for Making Micro or Nano Emulsions Comprising Non-Water-Soluble Oil and Water In one aspect, some alternatives of the present disclosure relate to methods of making micro or nano emulsions, which comprise a non-water-soluble oil and water (FIG. 1). As used herein, the term "micro or nano emulsion" refers to a dispersion of two immiscible liquids, one liquid phase being "dispersed" and the other being "continuous". In general, micron- or nano-sized micelles in micro or nano emulsions provide very desirable qualities of agriculture chemicals, namely greater solubility and stability, higher bioavailability and a higher dissolution rate, and a smaller particle size. The micro or nano emulsions prepared by the methods disclosed herein can be in the form of either oil-in-water or water-in-oil, which can be selected as appropriate depending on applications and purposes.

Accordingly, in some alternatives, the micro emulsions prepared by the methods described herein and utilized in the methods described herein comprise micro-sized micelles having a mean or average micelle diameter of from about 1 micron to about 5 microns, e.g., 1.0 microns, 1.5 microns, 2.0 microns, 2.5 microns, 3.0 microns, 3.5 microns, 4.0 microns, 4.5 microns, 5.0 microns in diameter or a number within a range defined by any two of the aforementioned diameters.

In some alternatives, the nano emulsions made by the methods described herein and utilized in the methods described herein comprise nano-sized micelles having a mean or average micelle diameter that is greater than zero microns but not more than about 0.95 microns in diameter, not more than about 0.5 microns in diameter, not more than about 0.05 microns in diameter, or not more than about 0.01 microns in diameter.

In some alternatives, the average micelle diameter of the micro and nano emulsions prepared by the methods described herein and utilized in the methods described herein can be determined by a number of suitable techniques and systems including, but not limited to, photon correlation spectroscopy (PCS), total-intensity light scattering (TILS), static light scattering (SLS), dynamic light scattering (DLS), laser diffraction (LD), small-angle neutron scattering (SANS), transmission electron microscopy (TEM), nuclear magnetic resonance (NMR), spectrophotometric measurements, and small angle X-ray scattering. A particular suitable method for determining micelle or particle size/diameter is laser diffraction or dynamic light scattering with instruments manufactured by, for example, Malvern Instruments (Malvern, United Kingdom) such as a Malvern Zetasizer, or by Horiba International (Kyoto, Japan) such as a Particle Size Analyzer.

In some alternatives, the methods of making micro or nano emulsions disclosed herein, which can be used in some of the methods disclosed herein, involve an impinging fluid jet stream technique in which two or more impinging jets are used to achieve high intensity mixing of fluids so as to form substantially homogeneous micro or nano micelles. Apparatuses and processes useful for methods of impinging jets to achieve high intensity mixing of non-water-soluble oil and water can be found in further detail in, for example, U.S. Pat. Nos. 5,314,506 and 6,302,958, both of which are incorporated by reference herein. Typically, the process by which these micro or nano micelles are produced involves two or more impinging liquid jets positioned within a well stirred flask to achieve high intensity mixing. At the point where the two or more jets strike one another a very high level of supersaturation exists. As a result of this high supersaturation, crystallization occurs extremely rapidly within the small mixing volume at the impingement point of the two or more liquids. Since new crystals are constantly nucleating at the impingement point, a very large number of crystals, i.e. micro or nano micelles, are produced.

Some alternatives disclosed herein relate to methods of making micro or nano emulsions that include an oil and water including: sonicating a first fluid jet stream including the oil and a second fluid jet stream including water, wherein the sonicating is performed by positioning a tip of a sonication probe within a gap defined between a first fluid jet, which emits the first fluid jet stream, and a second fluid jet, which emits the second fluid jet stream. The first and the second fluid jets are positioned such that the fluid jet streams from the first fluid jet and the second fluid jet impinge in the gap between the jets so as to create a point of high turbulence at the point of impact of the fluid jet streams. In the methods, each of the fluid jet streams have sufficient linear velocity to achieve high intensity mixing of the oil and water, preferably a non-ethoxylated oil or an ethoxylated oil and water, and the sonication probe provides ultrasonic energy in the immediate vicinity of the impinging fluid jet streams which thereby generates a micro or nano emulsion that comprises oil and water.

In some alternatives of the methods described herein, the first fluid jet stream has a linear velocity of at least 100, 200, 300, 400, 500, 600, 700, 800, or 900 m/s or a linear velocity within a range defined by any two of the aforementioned linear velocities. For example, the first fluid jet stream can have a linear velocity from about 100 m/s to about 900 m/s. In some alternatives, the second fluid jet stream has a linear velocity of at least 100, 200, 300, 400, 500, 600, 700, 800, or 900 m/s or a linear velocity within a range defined by any two of the aforementioned linear velocities. For example, the second fluid jet stream can have a linear velocity from about 100 m/s to about 900 m/s. In some alternatives, the first jet stream and the second jet stream have the same linear velocity. In some alternatives, the first jet stream and the second jet stream have different linear velocities.

In some alternatives of the methods described herein, the first and second fluid jet streams are contacted under a pressure of 25,000-50,000 psi or at a pressure that is within a range defined by any two numbers within the range of 25,000-50,000 psi. For example, the first and second fluid jet streams can be contacted under a pressure of about 25,000 psi to about 50,000 psi. In addition, after the first and second fluid jet streams are contacted under the named pressure, the resultant micro or nano emulsions that include the oil, preferably non-ethoxylated oil or an ethoxylated oil, and water is brought to atmospheric pressure.

In some alternatives, the sonicating is conducted above the freezing point of water but less than or equal to ambient temperature such as, for example, 1, 2, 3, 4, 5, 6, 7, 8, 9, 10, 11, 12, 13, 14, 15, 16, 17, 18, 19, 20, 21, 22, 23, 24, or 25 degrees Celsius or at a temperature that is within a range defined by any two of the aforementioned temperatures. For example, the sonicating can be conducted at about 1 degree Celsius to about 25 degrees Celsius.

In some alternatives, the temperature of the first fluid jet stream is above the freezing point of water but less than or equal to ambient temperature such as, for example, 1, 2, 3, 4, 5, 6, 7, 8, 9, 10, 11, 12, 13, 14, 15, 16, 17, 18, 19, 20, 21, 22, 23, 24, or 25 degrees Celsius or at a temperature that is within a range defined by any two of the aforementioned temperatures. For example, the temperature of the first fluid jet stream can be at about 1 degree Celsius to about 25 degrees Celsius.

In some alternatives, the temperature of the second fluid jet stream is above the freezing point of water but less than or equal to ambient temperature such as, for example, 1, 2, 3, 4, 5, 6, 7, 8, 9, 10, 11, 12, 13, 14, 15, 16, 17, 18, 19, 20, 21, 22, 23, 24, or 25 degrees Celsius or at a temperature that is within a range defined by any two of the aforementioned temperatures. For example, the temperature of the second fluid jet stream can be at about 1 degree Celsius to about 25 degrees Celsius.

In some alternatives, the temperature of the first fluid jet stream and the temperature of the second fluid jet stream are the same. In some alternatives, the temperature of the first fluid jet stream and the temperature of the second fluid jet stream are different.

In some alternatives of this and other aspects of the present invention, the micro or nano emulsions prepared by the methods disclosed herein comprise a non-ethoxylated macadamia nut oil and water. In some alternatives, the macadamia nut oil is ethoxylated.

In some alternatives, the bioactive solutions prepared by the methods disclosed herein consist of a water-soluble oil and water. In some alternatives, the water-soluble oil is an ethoxylated oil. Such an ethoxylated oil can be derived from a plant, plant part, tree, marine, animal, or synthetic source, or from fatty acid, unsaturated fatty acid, fatty alcohol, or fatty amine having e.g., at least 10, 11, 12, 13, 14, 15, 16, 17, 18, 19, or more ethoxylations per molecule or a value that is within a range defined by any two of the aforementioned ethoxylations per molecule. For example, ethoxylated oil derived from a plant, plant part, tree, marine, animal, or synthetic source, or from fatty acid, unsaturated fatty acid, fatty alcohol, or fatty amine can have an ethoxylation per molecule or a value of about 10 to about 19. In some cases, ethoxylated oils are obtained or created from, for example but not limitation, fatty alcohol, oleic acid, palmitoleic acid, apricot kernel oil, avocado oil, evening primrose oil, grape seed oil, hazelnut oil, pumpkinseed oil, rosehip oil, safflower oil, sunflower oil, walnut oil, wheat germ oil, neem oil, mink oil, lanolin, argan oil, abyssinian oil, *Salvia hispanica* oil (chia seed oil), *Calophyllum tacamahaca* seed oil (tamanu oil), squalane, sea buckthorn oil, castor oil, olive oil, corn oil, sesame oil, or emu oil. In some alternatives, preferred oils are macadamia nut oil, jojoba oil, or meadowfoam oil, or any combination thereof. In some alternatives, the ethoxylated oil that is used in the methods described herein is obtained or created from macadamia nut oil. In some cases, the ethoxylated oil can have an average number of ethoxylations per molecule that is 10, 11, 12, 13, 14, 15, 16, 17, 18, or 19 or an average number of ethoxylations per molecule that is within a range defined by any two of the aforementioned values. For example, the ethoxylated oil can have an average number of ethoxylations per molecule of about 10 to about 19. In one alternative, the ethoxylated oil is obtained from macadamia nut oil with 16 ethoxylations per molecule.

Depending on the intended applications, the amount of oil(s) suitable for the methods described herein can vary. For example, in some alternatives, the amount of non-ethoxylated oil or ethoxylated oil in the micro or nano emulsions or bioactive solutions is from about 0.01% to about 50%. That is, some alternatives of the methods described herein can comprise a micro or nano emulsion or bioactive solution containing less than or equal to 0.01%, 0.025%, 0.05%, 0.075%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.25%, 1.5%, 1.75%, 2.0%, 2.25%, 2.5%, 2.75%, 3.0%, 3.25%, 3.5%, 3.75%, 4.0%, 4.25%, 4.5%, 4.75%, 5.0%, 5.25%, 5.5%, 5.75%, 6.0%, 6.25%, 6.5%, 6.75%, 7.0%, 7.25%, 7.5%, 7.75%, 8.0%, 8.25%, 8.5%, 8.75%, 9.0%, 9.25%, 9.5%, 9.75%, 10.0%, 10.25%, 10.5%, 10.75%, 11.0%, 11.25%, 11.5%, 11.75%, 12.0%, 12.25%, 12.5%, 12.75%, 13.0%, 13.25%, 13.5%, 13.75%, 14.0%, 14.25%, 14.5%, 14.75%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, or 50.0% oil(s) by weight or volume of non-ethoxylated oil or ethoxylated oil or an amount that is within a range defined by any two of the aforementioned amounts. For example, the amount of non-ethoxylated oil or ethoxylated oil in the micro or nano emulsion or bioactive solution can be from about 0.01% to about 50% by weight or volume (e.g., from about 0.01% to about 1%, or from about 0.01% to about 2%, or from about 0.01% to about 4%). In some cases, the amount of oil in the micro or nano emulsions or bioactive solutions is 0.1%, 0.25%, 0.5%, 0.75%, 1%, 1.5%, 2%, 2.5%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% by weight or volume or an amount that is within a range defined by any two of the aforementioned amounts. For example, the amount of oil in the micro or nano emulsion or bioactive solution can be from about 0.1% to about 25% by weight or volume (e.g., from about 0.1% to about 1%, or from about 0.1% to about 2%, or from about 0.1% to about 4%). In some cases, the amount of oil in the bioactive solutions is about 1%, the amount of oil in the bioactive solutions is about 2%, or the amount of oil in the bioactive solutions is about 4%.

In some alternatives, included in the bioactive solutions are additives useful in, for example but not limitation, the agricultural, viticulture, golf course, nursery, horticulture, or grower industries, including, but not limited to, any naturally occurring or synthetic chemical or any component thereof that is used in a chemical composition including, but not limited to, fertilizers, insecticides, acaricides, nematicides, fungicides, bactericides, herbicides, plant growth regulators, biostimulants, biopesticides, nutrients, drift reduction agents, utility adjuvants, water conditioners, penetrants, pH buffers, activators, surfactants, stabilizers, preservatives, stickers, spreaders, wetting agents, adjuvants, diluents, detergents, adhesives, anticaking agents, dyes, dispersants, emulsifying agents, defoamers, antimicrobials, antifreeze, pigments, colorants, carriers, or any embodiment of an agricultural chemical or additive found in "Chemistry and Technology of Agrochemical Formulations," edited by D. A. Knowles, copyright 1998 and published by Kluwer Academic Publishers, hereby incorporated by reference. Such additives can act as a carrier to conveniently apply the bioactive solution to plants, plant parts or seed treatments or in the vicinity of plants, plant parts or seed treatments in order to modify plant growth and reduce water consumption by plants as described herein.

In some alternatives, the methods of making micro or nano emulsions described herein further include adding the micro or nano emulsions to a reservoir of water and thereby contacting a plant with this bioactive solution, which is the mixture of micro or nano emulsions and water. The micro or nano emulsions can be added to stagnant, sprayed or flowing water. For example, in some alternatives of the methods described herein, the micro or nano emulsions are added to a stagnant body of water and mixed or agitated to form a reservoir of stagnant bioactive solution. In some alternatives, the methods described herein further comprise contacting a plant with the reservoir of stagnant bioactive solution. Suitable reservoirs of water include, but are not limited to, water contained in a container, a mixing vessel, a mixing tank, a mixing kettle, a water softener system, a water purification system, a water filtration system, an irrigation system, a storage tank, and water sourced from a surface water source, a snowpack, a stream, a river, a lake, a reservoir, a well, a pond, a canal or a municipal water source. In some alternatives, the micro or nano emulsions are added by metering in-line, in real time, to sprayed or flowing water, mixing or agitating the micro or nano emulsion with the sprayed or flowing water to create a sprayable or flowable bioactive solution, and contacting a plant with such sprayable or flowable bioactive solution.

In some alternatives, the methods of making bioactive solutions described herein further include introducing the bioactive solution into a solution, liquid, mixture, suspension, concentrate or formula comprising at least one agricultural chemical or a component thereof.

In some alternatives, the bioactive solution is further formulated into dissolvable beads with different dissolution rates to provide for longer term delivery, stability, and/or reduction of oxidation of the oil or emulsion used in the bioactive solution. Such beads could then be applied to a reservoir of water that is then prepared to be applied to plants, or mixed directly into the soil as a soil amendment in order to modify the growth of plants and/or reduce water consumption of plants.

The following examples are offered by way of illustration and not by way of limitation.

EXAMPLES

Example 1: Pretreatment of Plants with an Ethoxylated Oil and Water Mixture Before Drought Stress An experiment was conducted to determine whether pretreatment of plants with an ethoxylated oil and water mixture can reduce or otherwise ameliorate any of the negative effects that drought or water stress can have on plants.

Materials and Methods

The treatments involved four doses (0, 1, 2, and 4% v/v) of an ethoxylated macadamia nut oil (EMNO) (source: The HallStar Company, Chicago, IL, USA) added to the irrigation water and mixed by hand with a stirring rod until the combination of EMNO and water was homogeneous. The four treatments were each replicated five times. Three plants were tested: Sudangrass (*Sorghum bicolor* ssp. *drummondii*), cowpea (*Vigna unguiculata*), and alfalfa (*Medicago sativa*). Each of such plant's seeds were planted in 1 gallon pots containing standard potting mix (prepared soil and organic matter). After emergence, each pot was thinned to 10 plants per pot.

Prior to initiation of drought stress, each pot was watered to saturation every three days with water containing either 1, 2, or 4% v/v of an ethoxylated macadamia nut oil or just water alone. At 17 days after emergence (DAE), the watering was discontinued to stress all the plants for 8 days. The following characteristics were then evaluated: visual leaf dehydration (e.g., a plant with completely wilted leaves scored as 0, and a completely stress free or fully hydrated plant scored as 10) and plant height. Watering was then reinitiated to return all the pots to field capacity until the conclusion of the experiment. On 39 DAE, the experiment was concluded and the following characteristics measured:

Fresh weight of root, stem+leaves;
Dry weight of roots, stems+leaves; and
Water content in the stem+leaves, obtained by the difference between fresh and dry matter of the analyzed organs.

Treatment means were compared using the Dunnett T-test at the 5% probability level.

Results

The results of the experiment are shown in Tables 1-4. A 1% dosage of ethoxylated macadamia nut oil and water was sufficient to reduce the negative effects of drought stress for the three plant species tested as evidenced by the visual leaf dehydration ratings in Table 1. Like the plants treated with a 1% dosage of ethoxylated macadamia nut oil and water, plants of each of the three species that were treated with 2% and 4% dosages of ethoxylated macadamia nut oil and water also had visual leaf dehydration ratings that were significantly higher than the untreated control plants. However, root fresh and dry weight, and stem and leaf fresh and dry weight, and water content were lower for each of the three plant species treated with the 2% and 4% dosages relative to the untreated control plants.

TABLE 1

Average Values For Plant Height (HP) in Centimeters and Visual Leaf Dehydration (VLD) After 8 Days of Water Stress, 24 Days after Emergence in *Sorghum*, Alfalfa and Cowpea.

| | Sorghum | | Alfalfa | | Cowpea | |
|---|---|---|---|---|---|---|
| Treatments | HP | VLD | HP | VLD | HP | VLD |
| Control | 41.6 | 2.0 | 13.6 | 2.4 | 20.6 | 2.2 |
| H$_2$O + EMNO 1% | 46.2 | 7.4* | 15.2 | 9.8* | 21.0 | 9.0* |
| H$_2$O + EMNO 2% | 34.4 | 7.6* | 12.6 | 9.4* | 20.0 | 9.4* |
| H$_2$O + EMNO 4% | 26.8* | 7.8* | 11.8 | 9.2* | 17.6 | 7.2* |

TABLE 1-continued

Average Values For Plant Height (HP) in Centimeters and Visual
Leaf Dehydration (VLD) After 8 Days of Water Stress, 24 Days
after Emergence in *Sorghum*, Alfalfa and Cowpea.

|  | Sorghum | | Alfafa | | Cowpea | |
| --- | --- | --- | --- | --- | --- | --- |
| Treatments | HP | VLD | HP | VLD | HP | VLD |
| Average | 37.3 | 6.2 | 13.3 | 7.7 | 19.8 | 7.0 |
| CV(%) | 15.9 | 21.6 | 14.9 | 11.4 | 10.5 | 17.4 |

Mean values in each column followed by an asterisk differ from control at 5% probability by Dunnett's test.

TABLE 2

Average Values in Grams for Root Fresh Weight (RFW) and Stem +
Leaf Fresh Weight (SLFW) in *Sorghum*, Alfalfa and Cowpea.

|  | Sorghum | | Alfafa | | Cowpea | |
| --- | --- | --- | --- | --- | --- | --- |
| Treatments | RFW | SLFW | RFW | SLFW | RFW | SLFW |
| Control | 96.39 | 44.76 | 37.74 | 13.49 | 29.86 | 50.89 |
| $H_2O$ + EMNO 1% | 82.68 | 41.66 | 42.94 | 11.64 | 41.14* | 43.38 |
| $H_2O$ + EMNO 2% | 51.07* | 17.33* | 14.37* | 5.74* | 32.21 | 29.65* |
| $H_2O$ + EMNO 4% | 24.22* | 8.32* | 6.03* | 1.59* | 20.96* | 8.47* |
| Average | 63.59 | 28.02 | 25.27 | 8.11 | 31.04 | 33.10 |
| CV(%) | 43.41 | 34.69 | 29.53 | 23.67 | 19.63 | 16.09 |

Mean values in each column followed by an asterisk differ from control at 5% probability by Dunnett's test.

TABLE 3

Average Values in Grams for Root Dry Weight (RDW) and Stem +
Leaf Dry Weight (SLDW) of *Sorghum*, Alfalfa and Cowpea.

|  | Sorghum | | Alfafa | | Cowpea | |
| --- | --- | --- | --- | --- | --- | --- |
| Treatments | SLDW | RDM | SLDW | RDM | SLDW | |
| Control | 7.70 | 5.63 | 2.70 | 4.79 | 6.48 | |
| $H_2O$ + EMNO 1% | 7.45 | 6.11 | 1.98* | 4.83 | 6.39 | |
| $H_2O$ + EMNO 2% | 3.43* | 2.00* | 1.11* | 3.05* | 4.62* | |
| $H_2O$ + EMNO 4% | 2.09* | 0.81* | 0.54* | 1.73* | 1.28* | |
| Average | 5.17 | 3.64 | 1.58 | 3.60 | 4.69 | |
| CV(%) | 32.71 | 41.17 | 17.51 | 24.30 | 16.40 | |

Mean values in each column followed by an asterisk differ from control at 5% probability by Dunnett's test.

TABLE 4

Average Values in Grams for Water Content
(WC) in *Sorghum*, Alfalfa and Cowpea.

| Treatments | Sorghum WC | Alfafa WC | Cowpea WC |
| --- | --- | --- | --- |
| Control | 37.06 | 10.79 | 44.41 |
| $H_2O$ + EMNO 1% | 34.21 | 9.65 | 36.99* |
| $H_2O$ + EMNO 2% | 13.90* | 4.63* | 25.04* |
| $H_2O$ + EMNO 4% | 6.23* | 1.05* | 7.19* |
| Average | 22.85 | 6.53 | 28.41 |
| CV(%) | 35.26 | 24.91 | 16.33 |

Mean values in each column followed by an asterisk differ from control at 5% probability by Dunnett's test.

Example 2: Water Savings and Plant Growth
Effects of an Ethoxylated Oil and Water Mixture on
Drought-Stressed Pansy, Petunia, and Tall Fescue
Plants An experiment was conducted to measure the water savings and effects on plant growth following application of an ethoxylated macadamia nut oil (EMNO) and water mixture for three plants: pansy, petunia, and tall fescue. Both pansy and petunia are bedding plants that are used widely as ornamental plants in residential, public, and commercial landscapes in North America and Europe. Tall fescue is a popular cool-season turfgrass in warm temperate regions of the United States as well as other regions in which Kentucky bluegrass does not thrive.

Materials and Methods

The experiment was conducted in an environmentally controlled (heated and cooled) greenhouse.

Experimental Design: Three experiments, one for each species, with 5 levels of EMNO (source: The HallStar Company, Chicago, IL, USA), each replicated four times in a randomized complete block design. The treatments involved five levels or doses of EMNO (0, 0.1, 0.25, 0.5 and 1% v/v) added to the irrigation water, each with four replications. The three plant species were pansy (*Viola× wittrockiana*; Swiss Giants, Mixed Colors; Ferry-Morse Seed Company, Norton, Massachusetts, USA), petunia (*Petunia nana*—multiflora; Dwarf Bedding, Mixed Colors; Ferry-Morse Seed Company, Norton, Massachusetts, USA) and tall fescue (*Festuca arundinacea* 'Titan RX'; Athens Seed Company, Watkinsville, Georgia, USA). Seeds were sown in 1 gallon round, tapered pots (16 cm top diameter, 13 cm bottom diameter, 17 cm height) containing a potting medium comprising 2 parts plaster sand, 1 part bark, and 1 part peat moss. Two plants per pot were used for pansy and *petunia*; eight seeds were placed in each pot then thinned to two seeds per pot after emergence. Tall fescue was seeded at the rate of one gram of seed per pot.

A Watermark sensor was placed in each pot to measure soil water potential. When soil water potential dropped to 15 centibars (cbar), the pot was replenished with nutrient solution ("Hoagland's Solution", Hoagland and Arnon (1950) Calif. Agr. Expt. Sta. Circ. 347.) and water containing 0.00%, 0.10%, 0.25%, 0.50% or 1.00% of EMNO to restore water potential to field capacity. Readings were performed daily once each species was fully established: 38 days for pansy (64 to 101 days after emergence (DAE)), 37 days for petunia, and 38 days for tall fescue (43 to 79 DAE).

EMNO was premixed manually with the nutrient solution in a 2 L container prior to treatment of the plants and applied beginning at 8 DAE for Pansy and Petunia and 9 DAE for Tall Fescue.

Water (drought) stress was initiated at 104 DAE for Pansy, 82 DAE for Petunia, and 83 DAE for Tall Fescue by discontinuing application of either irrigation water and nutrient solution only (control) or the mixture comprising irrigation water, EMNO and nutrient solution. The water stress was terminated 11 days later, which corresponds to 115 DAE for Pansy, 93 DAE for Petunia, and 94 DAE for Tall Fescue.

The following parameters were measured: water consumption (WC), water savings (WS), percentage of water savings (PWS), visual leaf dehydration (VLD), dry mass root (DMR), stem (DMS), leaf (DML), flower (DMF), and total (TDM).

The production of fresh matter is quite variable because it depends on the status of the amount of water found in the plant. Thus, dry weights were used as a more stable measure of growth.

The following formulas were used to calculate WS and PWS:

$$WS = \text{water consumption in the control} - \text{water consumption in the treatment}$$

$$PWS = \left(\frac{WS}{\text{water consumption in the control}}\right) * 100$$

Evaluation of visual leaf dehydration was performed 7 days after cessation of watering for all species.

Visual leaf dehydration measurements are a subjective way to check stress water in plants, although the symptomatology is very dependent on the plant species. In practice, irrigation management is performed based on visual leaf dehydration. As used herein, a 0 to 10 scale was used to determine visual leaf dehydration, with "0" being a plant with leaves that are completely wilted or essentially fully dehydrated and "10" being a plant with leaves appearing to be stress free or fully hydrated.

Additional parameters were measured for Tall Fescue: percentage of green turf coverage (PC), and the dark green color index (DGCI) by digital image analysis (DIA—"light box") in the week before and during the water stress. Digital images were collected under identical lighting conditions. These images were then analyzed using SigmaScan Pro software. This program calculates the number of green pixels in an image, providing a quantitative measure of turf coverage. Additionally, by comparing hue, saturation, and brightness levels, the software returns a DGCI value which can indicate overall health and aesthetic quality of turf.

Digital image analysis has been suggested as alternatives to visual ratings with respect to evaluating the color of turf grass since they provide objective measurements rather than subjective assessments. Quantifying a parameter of interest on a digital image by means of appropriate software has been used as a research tool across several agricultural disciplines (Karcher and Richardson (2013) "Digital image analysis in turfgrass research," In: B. Horgan et al., eds., *Turfgrass: Biology, use and management, Agron. Monogr. 56. ASA, CSSA, and SSSA*, Madison, WI, pp. 1133-1149). Specifically, DIA has been successfully used by researchers to assess turfgrass color (expressed as DGCI) and percent green cover (PCov) (Karcher and Richardson (2003) *Crop Sci.* 43:943-951; Richardson et al. (2001) *Crop Sci.* 41:1884-1888) since it was documented that such an analysis provides an accurate estimation of both parameters. Moreover, DIA has been shown to accurately quantify turfgrass establishment (Shaver et al. (2006) *Crop Sci.* 46:1787-1792; Schiavon et al. (2012) *Agron. J.* 104:706-714) and physiological stress caused by traffic (Sorochan et al. (2006) *Appl. Turfgrass Sci.* doi:10.1094/ATS-2006-0727-01-RS), or drought (Carrow and Duncan, 2003). Bunderson et al. ((2009) *HortTechnolgy* 19:626-632) used DIA and quality ratings to assess 20 different species and species mixtures of native and well-adapted turfgrasses. A detailed summary of the use of DIA in turfgrass research has been published by Karcher and Richardson ((2013) "Digital image analysis in turfgrass research," In: B. Horgan et al., eds., *Turfgrass: Biology, use and management, Agron. Monogr. 56. ASA, CSSA, and SSSA*, Madison, WI pp. 1133-1149).

Statistical Analysis

Treatment means were compared using the Tukey test at 5% probability and the mean comparison test. Percentage of green turf coverage and dark green color index data were analyzed as a split plot.

Results

For Pansy, Petunia, and Tall Fescue with respect to water savings specifically, there was an observed effect with the EMNO dose (Table 5).

EMNO affected all characteristics, except for DMR (Petunia), DMF (Petunia), TDM (Pansy and Tall Fescue), and DGCI (before stress, Tall Fescue), Tables 5-7.

Water Consumption (WC)

For Pansy, Petunia, and Tall Fescue, water consumption generally declined as the level of EMNO increased with the lowest water consumption observed at the highest level of EMNO (1.00%) for each species (Table 5). For all three species, the control treatment (0.00% EMNO) had the highest water consumption (Table 5), and water consumption was lower than the control for all species at all levels (0.10%, 0.25%, 0.50%, 1.00%) of EMNO.

Water Savings Relative to Control (WS)

For Pansy, Petunia, and Tall Fescue, water savings generally increased as the level of EMNO increased with the highest water savings for each of the three species at the highest level of EMNO (1.00%) (Table 5).

Percentage of Water Savings (PWS)

For Pansy, Petunia, and Tall Fescue, percentage of water savings (PWS) generally increased as the level of EMNO increased with the highest PWS for each of the three species at the highest level of EMNO (1.00%) (Table 5).

Visual Leaf Dehydration (VLD)

For Pansy, treatment 5 (1.00% EMNO) was superior to treatment 2 (0.1% EMNO) and the control. For Petunia, treatment 5 (1.00% EMNO) was superior to all other treatments and the control. For Tall Fescue, treatments 5 and 4 (1.00 and 0.50% EMNO, respectively) were superior to all other treatments and the control (Table 5).

TABLE 5

Water Consumption (WC), Water Savings Relative to Control (WS) and Percentage of Water Savings (PWS) to Maintain Plant Available Water, and Visual Leaf Dehydration (VLD) for Pansy, *Petunia*, and Tall Fescue.

| | Treatments | | | | |
|---|---|---|---|---|---|
| Species | No. 1 Control | No. 2 $H_2O$ + 0.10% | No. 3 $H_2O$ + 0.25% | No. 4 $H_2O$ + 0.50% | No. 5 $H_2O$ + 1.00% |
| | WC (mL/pot) | | | | |
| Pansy | 4,800a[1] | 3,238b | 3,150b | 2,800b | 2,188b |
| Petunia | 5,688a | 3,763b | 3,938b | 3,500b | 2,538c |
| Tall Fescue | 3,363a | 3,075ab | 2,400bc | 2,100c | 1,838c |
| | WS (mL/pot) | | | | |
| Pansy | 0b | 1,563a | 1,650a | 2,000a | 2,613a |
| Petunia | 0c | 1,925b | 1,750b | 2,188b | 3,150a |
| Tall Fescue | 0c | 288bc | 963ab | 1,263a | 1,525a |
| | PWS (%) | | | | |
| Pansy | 0.00c | 29.26b | 32.70ab | 38.63ab | 52.93a |
| Petunia | 0.00c | 33.88b | 30.75b | 38.58b | 55.14a |
| Tall Fescue | 0.00c | 8.64bc | 28.44ab | 37.10a | 44.76a |
| | VLD[2] | | | | |
| Pansy | 1.75b | 3.75b | 4.50ab | 5.50ab | 9.75a |
| Petunia | 0.75b | 0.75b | 0.75b | 2.25b | 7.25a |
| Tall Fescue | 1.00b | 1.00b | 0.75b | 6.50a | 7.00a |

[1] Within each species, mean values followed by the same letter are equivalent (Tukey's least significant difference test, $P < 0.05$).
[2] VLD ratings were made 7 days after initiation of the water stress.

With increasing EMNO dose, there was a decrease in water consumption in the three species studied (Table 5). Relative to control, the amount of water savings increases with increasing EMNO dose (Table 5).

For Pansy, a water savings of 52% was observed at the 1% EMNO dose, and for Petunia, a water savings of 55% was observed at the 1% EMNO dose. For Tall Fescue, a water savings of 44% was observed at the 1% EMNO dose (Table 5).

Figure 2A:
FIGS. 2A-2B are photographic illustrations of the effects of ethoxylated macadamia nut oil (EMNO) dose on Pansy plants under water stress for 5 days (FIG. 2A) and 11 days (FIG. 2B).
Figure 2B:

EMNO dosage also had an effect on visual leaf dehydration (Table 5). With respect to Pansy, there were observable visual effects of the 0.5% and 1% EMNO doses after five days of water stress (FIG. 2A). Also with respect to Pansy, no dehydration was observed for the 1% EMNO dose until 11 days after suspension of irrigation water (FIG. 2B).

Figure 3A:
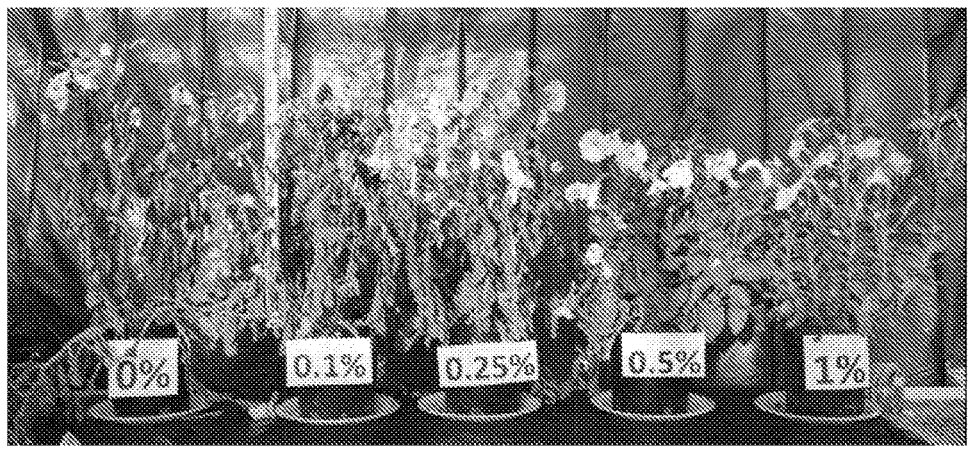
FIGS. 3A-3B are photographic illustrations of the effects of EMNO dose on *Petunia* plants under water stress for 4 days (FIG. 3A) and 5 days (FIG. 3B).
Figure 3B:
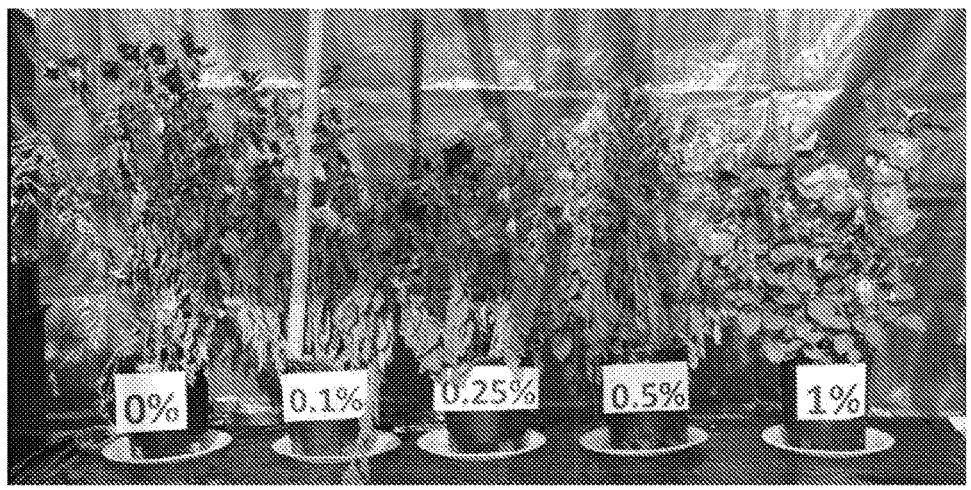

Petunia showed signs of dehydration after 4 days of water stress and displayed the greatest differences between EMNO treatments (FIGS. 3A and 3B).

Figure 4A:
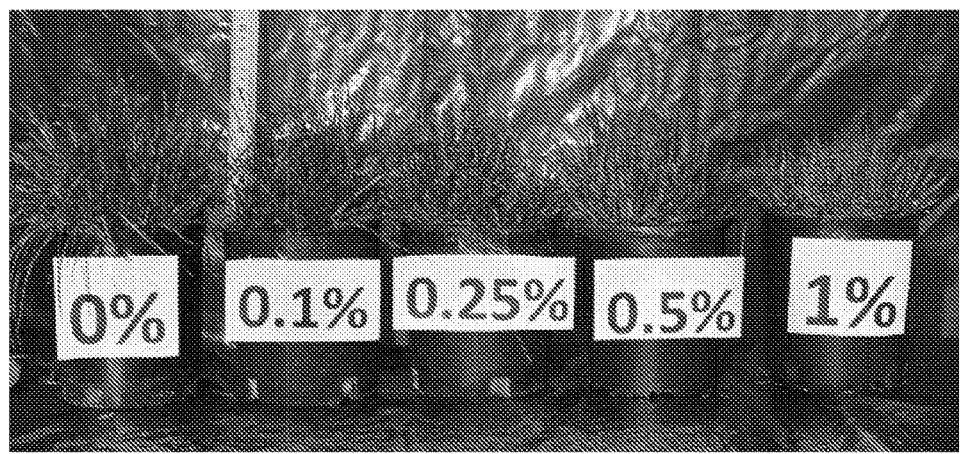
FIGS. 4A-4B are photographic illustrations of the effects of EMNO dose on Tall Fescue plants under water stress for 5 days (FIG. 4A) and 6 days (FIG. 4B).
Figure 4B:
Figures 5A, 5B, 5C, 5D, 5E, 5F:
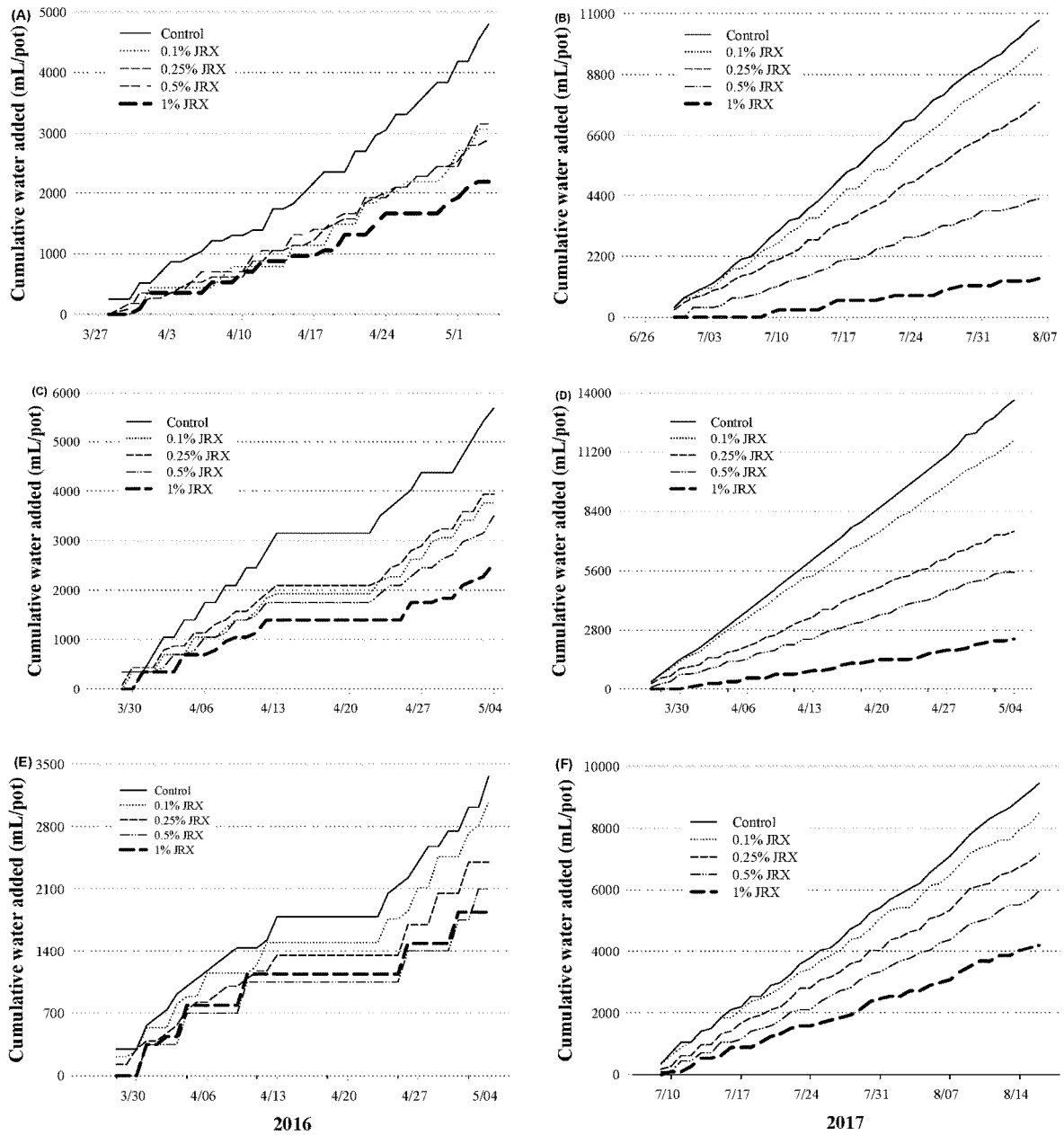
FIGS. 5A-5F are graphs plotting the cumulative water added on pansy in 2016 [EMNO Lot #1] (A) and in 2017 [EMNO Lot #2] (B), petunia in 2016 [EMNO Lot #1] (C) and in 2017 [EMNO Lot #2] (D), and tall fescue in 2016 [EMNO Lot #1] (E) and in 2017 [EMNO Lot #2] (F).
Figures 6A, 6B, 6C, 6D:
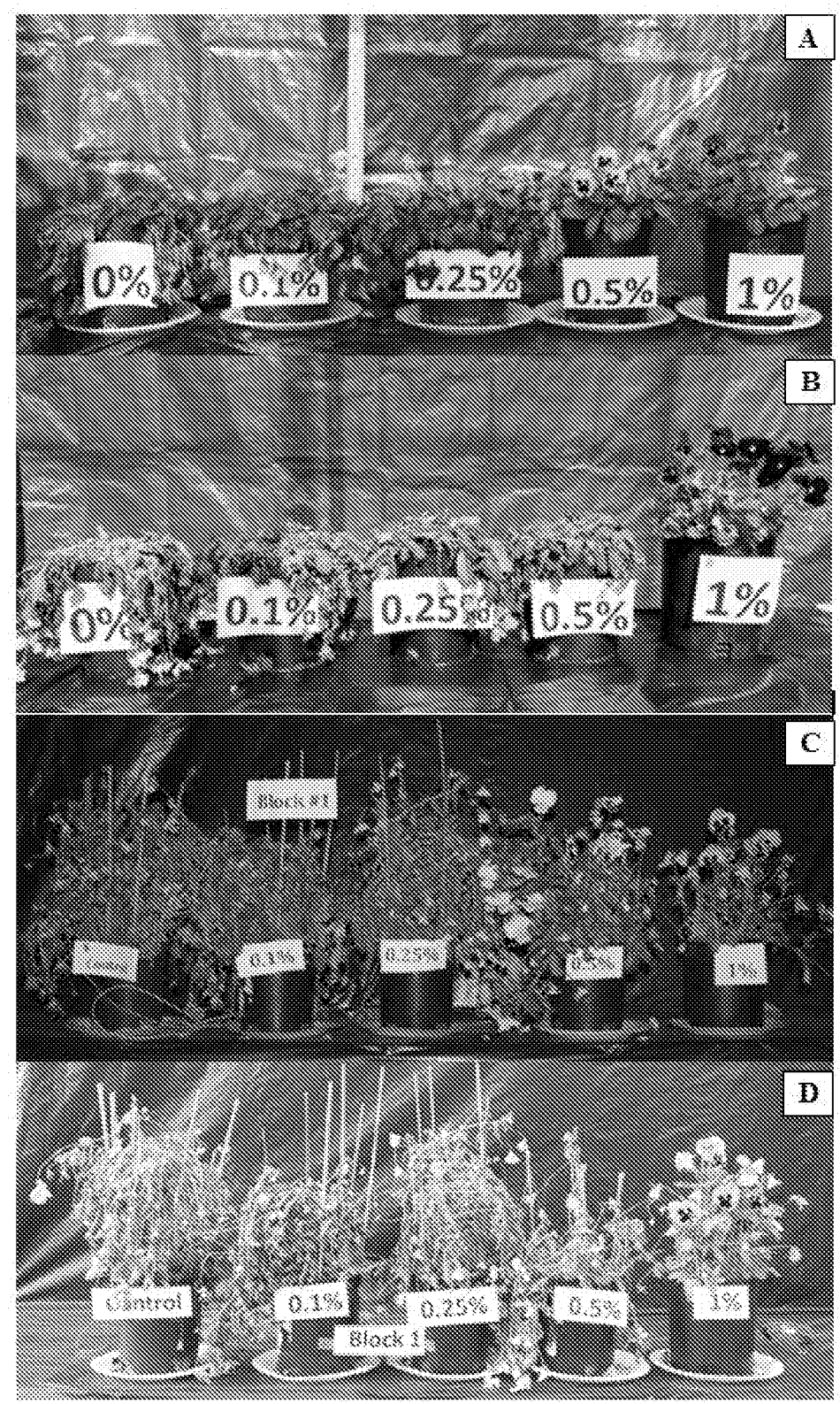
FIGS. 6A-6D are photographs of pansy at 5 days (A and C) and 11 days (B and D) after water stress (meaning: without receiving any water) tested in 2016 (A and B, EMNO Lot #1) and tested in 2017 (C and D, EMNO Lot #2).
Figures 8A, 8B:
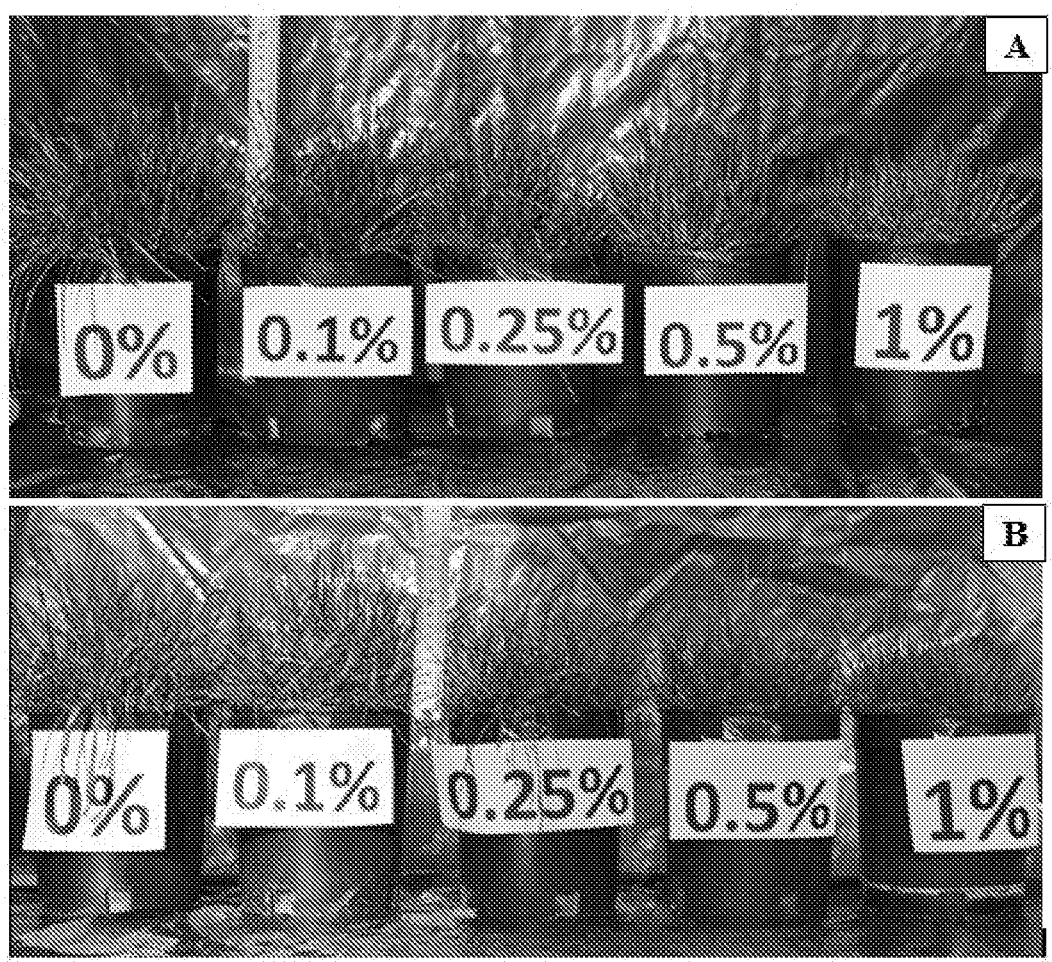
FIGS. 8A-8B are photographs of tall fescue at 5 days (A) and 6 days (B) after water stress (meaning: without receiving any water) tested in 2016 (A and B, EMNO Lot #1).
Figure 9:
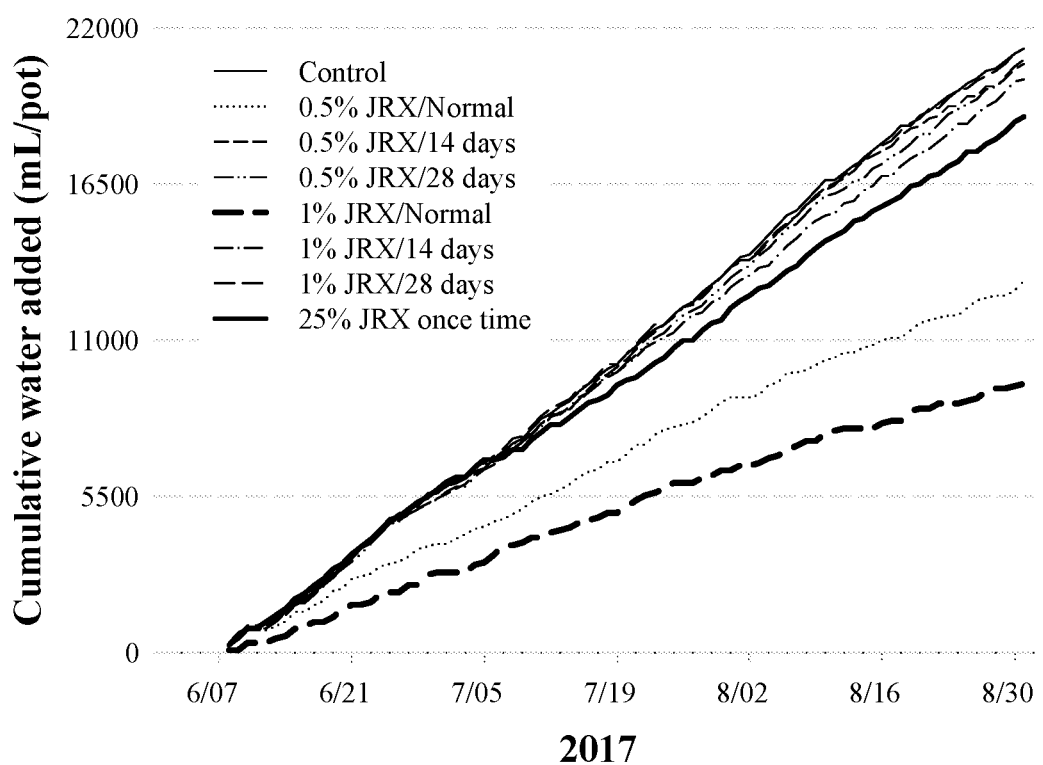
FIG. 9 is a graph plotting cumulative water added to tall fescue treated with EMNO (Lot #2).
Figure 10:
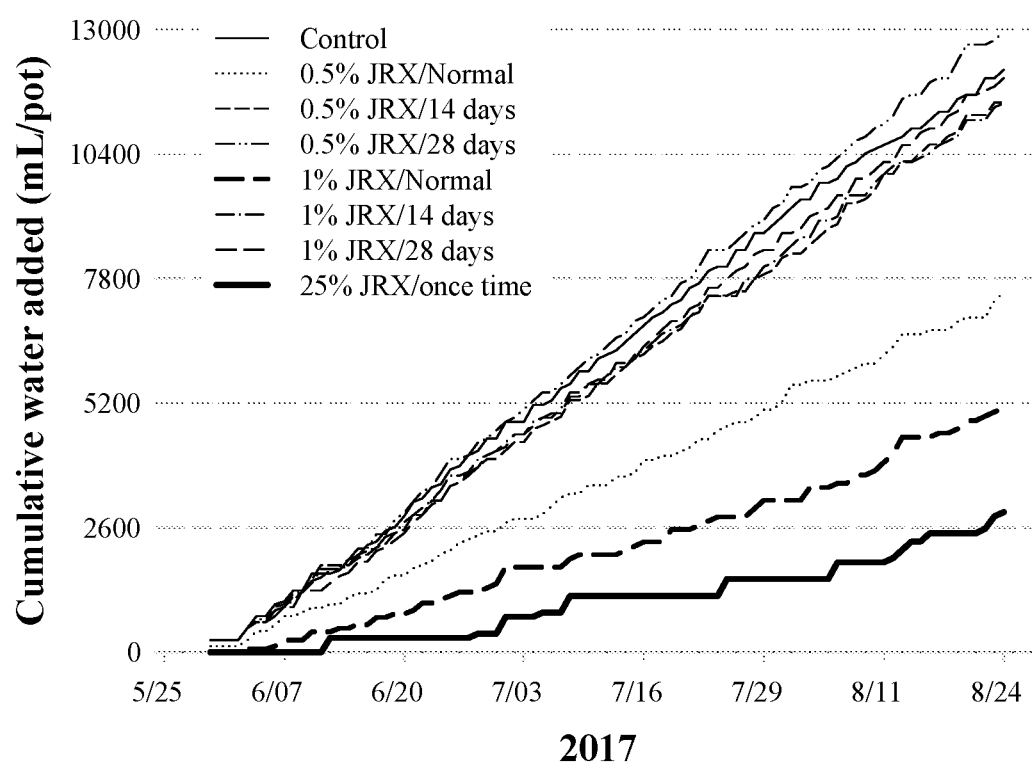
FIG. 10 is a graph plotting cumulative water added to Bermuda treated with EMNO (Lot #2).
Figure 11:
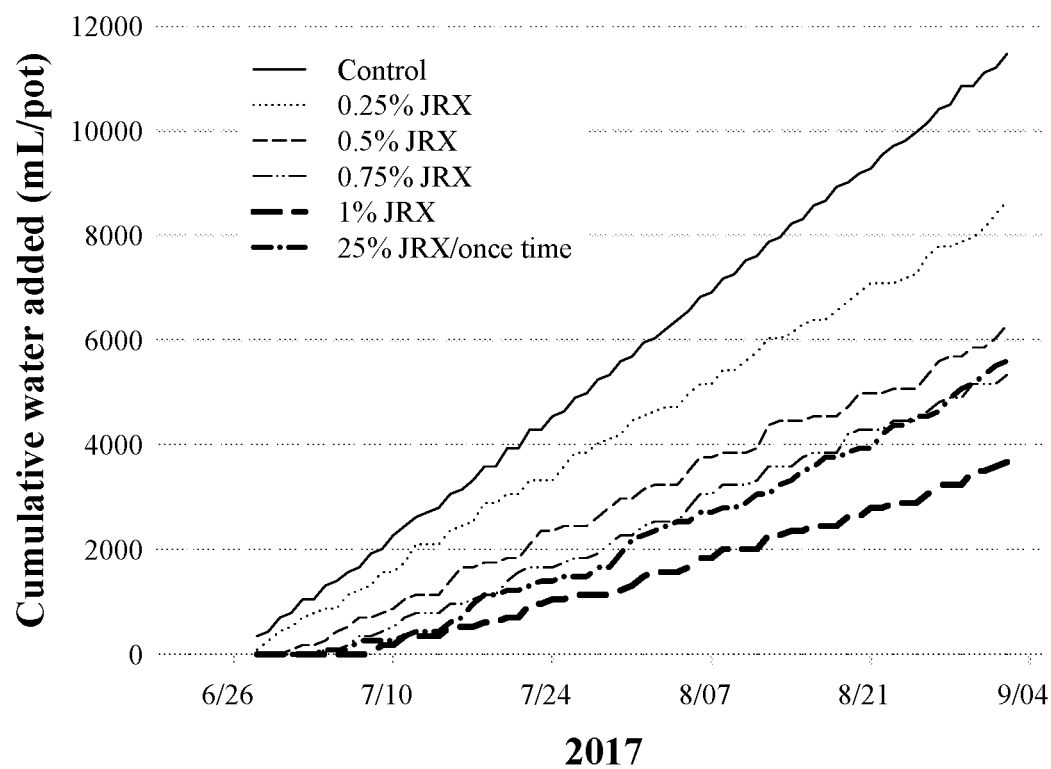
FIG. 11 is a graph plotting cumulative water added to Bermuda treated with ethoxylated castor oil (ECO).
Figure 12:
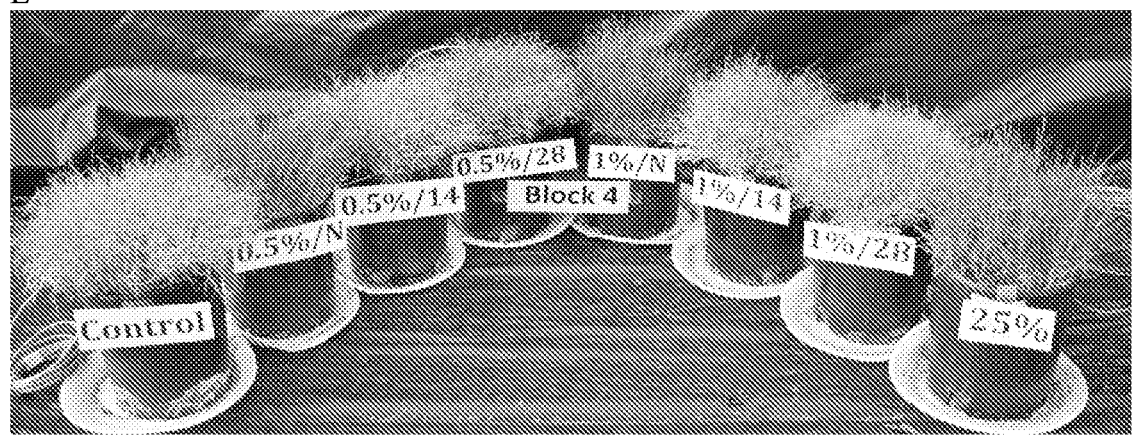
FIGS. 12A-12E are photographs of Bermuda at 11 days (A-E) after water stress (meaning: without receiving any water) tested in 2017 (A-E, EMNO Lot #2).

Tall Fescue showed signs of dehydration after 5 days of water stress and displayed differences between EMNO treatments (FIGS. 4A and 4B).

Root Dry Matter (DMR)

For Pansy and Tall Fescue, there was a significant effect of EMNO dose for root dry matter (Table 6). Treatment 5 (1.00% EMNO) was superior (i.e. a higher root dry matter) to all other treatments and the control for both Pansy and Tall Fescue. For Petunia, the average root dry matter of the plants treated with 0.1%, 0.25%, 0.50%, or 1.00% EMNO was not significantly different from the control plants or each other.

Stem Dry Matter (DMS)

For Pansy and Petunia, there was a significant effect of EMNO dose on stem dry matter (Table 6). For Pansy, the control (0.00% EMNO) plants had higher stem dry matter than the treated plants. For Petunia, the control (0.00% EMNO) had significantly higher stem dry matter than the plants treated with 1.00% EMNO.

Leaf Dry Matter (DML)

For Pansy, Petunia, and Tall Fescue, there was a significant effect of EMNO dose on leaf dry matter (Table 6). For Pansy and Tall Fescue, only plants treated with 1.00% EMNO had significantly lower leaf dry matter than their respective control plants. For Petunia, plants treated with 0.50% and 1.00% EMNO had a significantly lower leaf dry matter than the control plants and plants treated with 0.10% and 0.25% EMNO.

Flower Dry Matter (DMF)

For Pansy, there was a significant effect of EMNO dose on flower dry matter (Table 6). The control pansy plants (0.00% EMNO) had a significantly higher flower dry matter than any of the treated pansy plants. For Petunia, the average flower dry matter of the plants treated with 0.1%, 0.25%, 0.50%, or 1.00% EMNO was not significantly different than the control plants or each other.

Total Dry Matter (TDM)

For Petunia, there was a significant effect of EMNO dose on total dry matter (Table 6). The control petunia plants (0.00% EMNO) had a significantly higher average total dry matter than the petunia plants treated with 0.50% or 1.00% EMNO. For both Pansy and Tall Fescue, the average total dry matter of the plants treated with 0.1%, 0.25%, 0.50%, or 1.00% EMNO was not significantly different than the control plants or each other.

TABLE 6

Dry Matter for Root (DMR), Stem (DMS), Leaf (DML), Flower (DMF), and Total (TDM) for Pansy, *Petunia*, and Tall Fescue after 11 Days of Water Stress

| Species | Treatments | | | | |
|---|---|---|---|---|---|
| | No. 1 Control | No. 2 $H_2O$ + 0.10% | No. 3 $H_2O$ + 0.25% | No. 4 $H_2O$ + 0.50% | No. 5 $H_2O$ + 1.00% |
| | g/pot | | | | |
| | DMR | | | | |
| Pansy | 12.146c[1] | 10.56c | 11.05bc | 17.04b | 24.69a |
| *Petunia* | 5.06a | 4.84a | 6.00a | 4.01a | 2.75a |
| Tall Fescue | 8.74b | 9.76b | 7.84b | 8.73b | 16.12a |
| | DMS | | | | |
| Pansy | 7.26a | 4.98b | 4.65bc | 3.02cd | 2.50d |
| *Petunia* | 18.26a | 15.38ab | 14.06ab | 14.22ab | 12.01b |
| | DML | | | | |
| Pansy | 14.77a | 13.23a | 13.51a | 12.02ab | 9.09b |
| *Petunia* | 17.83a | 15.29b | 14.02b | 11.46c | 8.30d |
| Tall Fescue | 11.53a | 9.39ab | 11.28a | 9.03ab | 7.58b |
| | DMF | | | | |
| Pansy | 5.59a | 2.56b | 3.02b | 1.80b | 1.27b |
| *Petunia* | 9.36a | 7.36a | 8.12a | 7.88a | 6.43a |
| | TDM | | | | |
| Pansy | 39.76a | 31.32a | 32.23a | 33.88a | 37.55a |
| *Petunia* | 50.50a | 42.86ab | 42.20ab | 37.55bc | 29.49c |
| Tall Fescue | 20.27a | 19.15a | 19.12a | 17.76a | 23.70a |

[1]Within each species, mean values followed by the same letter are equivalent (Tukey's least significant difference test, $P < 0.05$).

There was a decrease in dry matter accumulation for the three species studied when treated with EMNO, except for root dry matter (Table 6). However, it appears that EMNO generally causes an increase in the ratio of root dry matter to above-ground dry matter (stems, leaves, flowers).

Application of EMNO can affect characteristics of tall fescue under both stressful and non-stressful conditions. Percentage of green turf coverage (PC) was reduced, compared to the control, by the 1.00% EMNO dose under non-stressful (or before stress) conditions and by the 0.5% and 1.00% EMNO doses under the stressed (or during stress) condition. Only the control pots and those receiving the 0.1% EMNO dose actually increased PC, when comparing the before stress values to the corresponding during stress values (Table 7).

TABLE 7

Percentage of Green Turf Coverage (PC) and Dark Green Color Index (DGCI) as Measured With Digital Image Analysis Using SigmaScan Pro Software, for Combinations of Time and Ethoxylated *Macadamia* Nut Oil (EMNO) Treatments after 7 Days of Water Stress.

| Treatments | Time | |
|---|---|---|
| | Before Stress[1] | During Stress[2] |
| | PC | |
| 1. Control | 74.27aB[3] | 79.35aA |
| 2. $H_2O$ + EMNO 0.10% | 71.58aB | 81.50aA |
| 3. $H_2O$ + EMNO 0.25% | 71.23aA | 74.22aA |
| 4. $H_2O$ + EMNO 0.50% | 66.81aA | 65.10bA |
| 5. $H_2O$ + EMNO 1.00% | 54.69bA | 51.13cA |
| | DGCI | |
| 1. Control | 0.49aA | 0.45bcB |
| 2. $H_2O$ + EMNO 0.10% | 0.51aA | 0.44cB |
| 3. $H_2O$ + EMNO 0.25% | 0.51aA | 0.44cB |
| 4. $H_2O$ + EMNO 0.50% | 0.48aA | 0.49abA |
| 5. $H_2O$ + EMNO 1.00% | 0.49aA | 0.50aA |

[1]The "Before Stress" values were determined at 44 DAE and following 36 days of exposure to the EMNO treatments.
[2]The "During Stress" values were determined after 7 days of water stress.
[3]Within each species, mean values followed by the same letter are equivalent (Tukey's least significant difference test, $P < 0.05$). The lower-case letter(s) compares the mean values down one column (e.g., Control vs. EMNO dose), and the Upper Case Letter compares the mean values between the two noted columns (e.g., a value in the "Before Stress" column vs. a value in the "During Stress" column).

The EMNO treatments had no significant effects on the Dark Green Color Index (DGCI) under non-stressed (or before stress) conditions relative to control, but when water stressed (or during stress), the 0.50% and 1.00% EMNO doses outperformed the control. When comparing the before stress values to their corresponding during stress values, all treatments and the control declined in DGCI under stress except for those treated with either 0.50% or 1.00% EMNO, which stayed the same (Table 7).

These results may indicate some inhibitory effect of EMNO on the growth of tall fescue, though under stressful conditions tall fescue is able to maintain a dark green color when compared to non-stressful conditions, indicating improved performance of turf for the 0.50% or 1.00% EMNO treatments.

Taken together, these results demonstrate that water savings can be achieved using EMNO (e.g., 1% EMNO). At the 1% EMNO dose, Pansy, Petunia, and Tall Fescue exhibited approximately a 50% water savings.

There are indications of some inhibitory effect of EMNO on the growth of the three plant species studied. However, the dry root matter values for both Pansy and Tall Fescue increased with the 1% EMNO dose when compared to the control value.

Importantly for floral ornamental plants, the Pansy and Petunia plants treated with EMNO did not stop producing flowers.

Example 3: Water Savings and Plant Growth Effects of an Ethoxylated Oil and Water Mixture on Pansy, Petunia, and Tall Fescue Applications of EMNO via irrigation water were evaluated for water savings in three species. This was a repeat of the experiment described in Example 2 herein. The experiments were conducted in an environmentally controlled (heated and cooled) greenhouse. The treatments involved five doses of EMNO added to the irrigation water (0, 0.1, 0.25, 0.5 and 1% v/v), each replicated four times. The following characteristics were measured: water consumption, amount of water saved, percentage of water saved, and visual quality. A substantial water savings was observed when a 1% EMNO dose was used. The species that exhibited impressive visual responses to water stress (meaning: after being deprived of all water) was pansy. At the 1% EMNO dosage, pansy, petunia, and tall fescue required, on average, 63% less water than their respective untreated controls. With the addition of EMNO, the pansy and petunia species did not stop producing flowers. See, FIGS. 5-8.

Experimental Design

Three experiments, one for each species, with 5 levels of EMNO, each replicated four times in a randomized complete block design, were performed. The treatments involved five doses of EMNO added to the irrigation water (0, 0.1, 0.25, 0.5 and 1% v/v), each with four replications. The three species tested were pansy, petunia, and tall fescue. Two plants per pot were used for pansy and petunia. They were seeded on average 8 seeds per pot germinated after buffing was performed, leaving two plants per pot. Tall fescue was seeded at the rate of one gram of seed per pot. Every pot (one gallon) used for all three species had the following measurements: 16 cm (diameter top)×13 cm (bottom)×17 cm (height).

For the pansy and petunia study, EMNO was added 8 days after emergence (DAE). For the tall fescue study, EMNO was added 9 DAE.

A watermark sensor was placed in each pot to measure soil water potential. When soil water potential dropped to 15 cbar (centibars), the pot was replenished with a standard amount of water and more nutrient solution (Hoagland) to restore water potential to field capacity. Readings were performed daily after each species was fully established: 38 days for pansy (64 to 101 DAE), and 37 days for petunia and tall fescue (43 to 79 DAE).

EMNO was premixed manually with the nutrient solution in a 2 L container using a 24V cordless brushless drill with a beater/mixing prong coupled.

Water stress was initiated (meaning: water stopped being applied) at 100 DAE for pansy, petunia, and tall fescue.

The following parameters were measured for pansy, petunia, and tall fescue, respectively: total water added (TWC), total water savings (TWS), percentage of water savings (PWS), and visual quality (Q).

The following formulas were used to calculate TWS and PWS:

$$TWS = \text{water added in the control} - \text{water added in the treatment}$$

$$PWS = \left(\frac{TWS}{\text{total water added in the control}}\right) * 100$$

Evaluation of visual quality (Q) was performed at 7 days after cessation of watering for all three species.

Statistical Analysis

Data were subjected to analysis of variance and regression. The models were chosen based on biological logic and goodness of fit. Treatment means were compared using the Tukey test at 5% probability.

Results

An effective EMNO dose was identified for all evaluated characteristics for pansy, petunia, and tall fescue (Table 8).

TABLE 8

Total water added (TWA), total water savings (TWS), percentage of water savings (PWS) relative to untreated control to maintain plant available water, and visual quality (Q) for pansy, petunia, and tall fescue.

| Treatment | Pansy Lot #1 (2016) | Pansy Lot #2 (2017) | Petunia Lot #1 (2016) | Petunia Lot #2 (2017) | Tall Fescue Lot #1 (2016) | Tall Fescue Lot #2 (2017) |
|---|---|---|---|---|---|---|
| TWA (mL/pot) | | | | | | |
| Control | 4800a | 10763a | 5688a | 13650a | 3363a | 9450a |
| H$_2$O + EMNO 0.10% | 3063b | 9800ab | 3763b | 11725a | 3075ab | 8488ab |
| H$_2$O + EMNO 0.25% | 3150b | 7788b | 3938b | 7438b | 2400bc | 7175bc |
| H$_2$O + EMNO 0.50% | 2888b | 4288c | 3500b | 5515b | 2100c | 5950c |
| H$_2$O + EMNO 1.00% | 2188b | 1400d | 2538c | 2363c | 1838c | 4200d |
| TWS (mL/pot) | | | | | | |
| Control | 0b | 0d | 0c | 0c | 0c | 0d |
| H$_2$O + EMNO 0.10% | 1738a | 963cd | 1925b | 1925c | 288bc | 963cd |
| H$_2$O + EMNO 0.25% | 1650a | 2975c | 1750b | 6213b | 963ab | 2275bc |

TABLE 8-continued

Total water added (TWA), total water savings (TWS), percentage of water savings (PWS) relative to untreated control to maintain plant available water, and visual quality (Q) for pansy, petunia, and tall fescue.

| | Pansy | | Petunia | | Tall Fescue | |
|---|---|---|---|---|---|---|
| Treatment | Lot #1 (2016) | Lot #2 (2017) | Lot #1 (2016) | Lot #2 (2017) | Lot #1 (2016) | Lot #2 (2017) |
| $H_2O$ + EMNO 0.50% | 1913a | 6475b | 2188b | 8135b | 1263a | 3500b |
| $H_2O$ + EMNO 1.00% | 2613a | 9364a | 3150a | 11288a | 1525a | 5250a |
| PWS (%) | | | | | | |
| Control | 0.00b | 0d | 0.00c | 0.00c | 0.00c | 0.00d |
| $H_2O$ + EMNO 0.10% | 33.53a | 8.31cd | 33.88b | 14.26c | 8.64bc | 9.94cd |
| $H_2O$ + EMNO 0.25% | 32.70a | 26.03c | 30.75b | 45.54b | 28.44ab | 23.50bc |
| $H_2O$ + EMNO 0.50% | 37.03a | 59.02b | 38.58b | 59.43b | 37.10a | 36.77b |
| $H_2O$ + EMNO 1.00% | 52.93a | 87.32a | 55.14a | 82.72a | 44.76a | 55.23a |
| Q | | | | | | |
| Control | 1.75b | 1.00b | 0.75b | 0.75c | 1.00b | 0.25b |
| $H_2O$ + EMNO 0.10% | 3.75b | 0.75b | 0.75b | 0.75c | 1.00b | 0.25b |
| $H_2O$ + EMNO 0.25% | 4.50ab | 1.00b | 0.75b | 0.75c | 0.75b | 1.25b |
| $H_2O$ + EMNO 0.50% | 5.50ab | 1.25b | 2.25b | 3.00b | 6.50a | 3.75a |
| $H_2O$ + EMNO 1.00% | 9.75a | 9.75a | 7.25a | 9.75a | 7.00a | 6.00a |

Within each species, means followed by the same letter are equivalent (Tukey's least significant difference test). $P < 0.05$.

Total Water Added (TWA)

For pansy and petunia, the control treatment (0.00% EMNO) exhibited the highest values. For tall fescue, the control treatment (0.00% EMNO) exhibited a higher value than treatment three, four, and five (0.25, 0.50, and 1.00% EMNO, Table 8).

Total Water Savings Relative to Control (TWS)

For pansy, treatment five (1.00% EMNO) was superior to the control. For petunia, treatment five was superior to all others. For tall fescue, treatment five and four (1.00 and 0.50% EMNO) were superior to control (Table 8).

Percentage of Water Savings (PWS)

For pansy, petunia and tall fescue, treatment five (1.00% EMNO) was superior to their respective controls (Table 8).

Visual Quality (Q)

For pansy, petunia and tall fescue, treatment five (1.00% EMNO) was superior to their respective controls (Table 8).

These results demonstrate that 1% EMNO produces substantial water savings. At the 1% EMNO dose, pansy, petunia, and tall fescue exhibited about 47% water savings during the 2016 experiment and about 63% water savings during the 2017 experiment. These results also demonstrate that pansy plants can exhibit substantial visual response to water stress. The addition of EMNO did not stop pansy and petunia species from producing flowers.

Example 4: Effects of Ethoxylated Oils and Water Mixture on Water Use for Turfgrass Applications of Ethoxylated Macadamia Nut Oil (EMNO) or Ethoxylated Castor Oil (ECO) via irrigation water were evaluated for water savings in two species (tall fescue and Bermuda). The experiments were conducted in an environmentally controlled (heated and cooled) greenhouse.

Experimental Design

Eight treatments were used for tall fescue and Bermuda EMNO experiments, each replicated four times:
 a) 1, untreated control, just water;
 b) 2 (tall fescue and Bermuda), 0.5% EMNO mixed with water and applied when needed;
 c) 3 (tall fescue and Bermuda), 0.5% EMNO mixed with water and applied every 14 days;
 d) 4 (tall fescue and Bermuda), 0.5% EMNO mixed with water and applied every 28 days;
 e) 5 (tall fescue and Bermuda), 1.0% EMNO mixed with water and applied when needed;
 f) 6 (tall fescue and Bermuda), 1.0% EMNO mixed with water and applied every 14 days;
 g) 7 (tall fescue and Bermuda), 1.0% EMNO mixed with water and applied every 28 days; and
 h) 8 (tall fescue and Bermuda), 25.0% EMNO mixed with water and applied one time.

Six treatments were used for Bermuda ECO experiments, each replicated four times:
 a) 1, untreated control, just water
 b) 2, 0.25% ECO mixed with water and applied when needed
 c) 3, 0.5% ECO mixed with water and applied when needed
 d) 4, 0.75% ECO mixed with water and applied when needed
 e) 5, 1.00% ECO mixed with water and applied when needed, and
 f) 6, 25.0% ECO mixed with water and applied when needed.

These species were seeded at the rate of two grams of seed per pot. Every pot (3 L) used had the following measurements: 16 cm (diameter top)×13 cm (bottom)×17 cm (height).

EMNO and ECO were added after 8 DAE. A watermark sensor was placed in each pot to measure soil water potential. When soil water potential dropped to 15 cbar (centibars), the pot was replenished with a standard volume of water and/or treatment and more nutrient solution (Hoagland and Miracle-gro) to restore water potential to field capacity. Readings were performed daily after each species was fully established. This took about 85 days for tall fescue of the EMNO experiment (31 to 115 DAE), 87 days for Bermuda of the EMNO experiment (31 to 117 DAE), and 85 days for Bermuda of the ECO experiment (56 to 140 DAE).

EMNO and ECO were premixed into water and the nutrient solution using a 24V cordless brushless drill with a beater/mixing prong coupled in a 2 L container.

Water stress was initiated at 117 DAE for tall fescue for the EMNO experiment, 119 DAE for Bermuda for the EMNO experiment, and 142 DAE for Bermuda for the ECO experiment.

The following parameters were measured: cumulative water added, total water added (TWA), total water savings (TWS), and percentage of water savings (PWS).

Statistical Analysis

The data were subjected to analysis of variance. Treatment means were compared using the Fisher's LSD test at 5% probability.

Results

There was lower water consumption in the treatment with 1% EMNO for tall fescue (Table 9). There was lower water consumption in the treatment with 1% and 25% EMNO on Bermuda (Table 9).

For each experiment, there were effective results after EMNO or ECO treatment for each evaluated characteristic (Tables 9 and 10).

TABLE 9

TWA, TWS, and PWS relative to control on tall fescue and Bermuda (EMNO) experiments.

| Treatment | Tall Fescue | Bermuda |
|---|---|---|
| | EMNO | |
| | TWA (mL/pot) | |
| Control | 21275a | 12160ab |
| 0.5%/Normal | 13100b | 7513c |
| 0.5%/14 days | 20738a | 11475b |
| 0.5%/28 days | 20890a | 12950a |
| 1.0%/Normal | 9475c | 5100d |
| 1.0%/14 days | 20200a | 11463b |
| 1.0%/28 days | 21275a | 11988ab |
| 25%/One time | 18875a | 2925e |
| | TWS (mL/pot) | |
| Control | 0c | 0de |
| 0.5%/Normal | 8175b | 4648c |
| 0.5%/14 days | 538c | 685d |
| 0.5%/28 days | 385c | −790e |
| 1.0%/Normal | 11800a | 7060b |
| 1.0%/14 days | 1075c | 698d |
| 1.0%/28 days | 0c | 173de |
| 25%/One time | 2400c | 9235a |
| | PWS (%) | |
| Control | 0.00c | 0.00d |
| 0.5%/Normal | 37.83b | 38.24c |
| 0.5%/14 days | 1.80c | 5.67d |
| 0.5%/28 days | 1.08c | −6.72d |
| 1.0%/Normal | 55.22a | 58.16b |
| 1.0%/14 days | 4.25c | 5.47d |
| 1.0%/28 days | −0.60c | 1.19d |
| 25%/One time | 9.31c | 75.94a |

TABLE 10

TWA, TWS, and PWS relative to control on Bermuda (ECO) experiment.

| Treatment | TWA (mL/pot) | TWS (mL/pot) | PWS (%) |
|---|---|---|---|
| Control | 11463a | 0d | 0.00d |
| 0.25% | 8663b | 2800c | 24.46c |
| 0.50% | 6300c | 5163b | 44.96b |
| 0.75% | 5338cd | 6125ab | 53.46ab |
| 1.00% | 3675d | 7788a | 67.91a |
| 25% | 5600c | 5863b | 50.86b |

Total Water Added (TWA)

For tall fescue (EMNO experiment) and Bermuda (EMNO and ECO experiments), treatment 1.00% resulted in lower water consumption. For Bermuda (EMNO experiment), treatment 25% resulted in low water consumption (Tables 10 and 11).

Water Savings Relative to Control (WS)

For tall fescue (EMNO experiment) and Bermuda (EMNO and ECO experiments), treatment 1.00% resulted in substantial water savings. For Bermuda (EMNO experiment), treatment 25% resulted in substantial water savings (Tables 10 and 11).

Percentage of Water Savings (PWS)

For tall fescue (EMNO experiment) and Bermuda (EMNO and ECO experiments), treatment 1.00% resulted in significant percentage of water savings. For Bermuda (EMNO experiment), treatment 25% resulted in significant percentage of water savings (Tables 10 and 11).

At the 1% dose, when treating tall fescue with EMNO and treating Bermuda with ECO, the grasses required 55% and 67%, respectively, less water than their untreated controls. At the 25% EMNO rate, Bermuda grass required 75% less water than its untreated control. Additional results are provided in FIGS. 9-12.

The article "a" and "an" are used herein to refer to one or more than one (i.e., to at least one) of the grammatical object of the article. By way of example, "an element" means one or more element.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps.

All publications, patents and patent applications mentioned in the specification herein are indicative of the level of those skilled in the art to which this invention pertains. All publications, patents and patent applications are herein incorporated by reference to the same extent as if each individual publication, patent or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claims.

As will be understood by one having ordinary skill in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed herein above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

What is claimed is:

1. A method for reducing water consumption by a plant, the method comprising: contacting a plant with a bioactive solution comprising a water-soluble or water-miscible oil and water, wherein the water-soluble or water-miscible oil is the product of an ethoxylation process, a transesterification process, a saponification process, or a micromixing process, wherein the water-soluble or water-miscible oil comprises an ethoxylated macadamia nut oil containing an average of between about 10 and about 19 ethoxylations per molecule, and wherein water consumption by the plant is reduced when compared to a control plant that has not been contacted with the bioactive solution.

2. The method of claim 1, wherein reducing water consumption comprises the application of a lesser volume of water to the plant contacted with the bioactive solution to maintain at least one growth parameter or characteristic relative to the control volume of water applied to the control plant that is required to maintain the at least one growth parameter or characteristic, wherein the lesser volume of water is at least 5%, 10%, 15%, 20%, 25%, 30%, 35%, 40%, 45%, 50%, 55%, 60%, 65%, 70%, 75%, 80%, 85%, 90%, or 95% less water than the control volume of water.

3. The method of claim 2, wherein the growth parameter or characteristic is selected from the group consisting of wilting, yellowing, lodging, turgidity, biomass, agronomic yield, photosynthesis, growth rate, root weight, root length, shoot weight, shoot length, leaf weight, leaf length, flower production, petal production, seed production, bulb production, fruit production, vegetable production, salinity tolerance, plant green color, leaf green color, chlorophyll content, respiration, pollen production, protein content, deoxyribonucleic acid (DNA) synthesis, ribonucleic acid (RNA) synthesis, and cell division.

4. The method of claim 1, wherein the plant is contacted with the bioactive solution by applying the bioactive solution to the soil or growth medium in the vicinity of the plant, wherein the bioactive solution is applied to the growth medium, and wherein the growth medium is a hydroponic growth medium or a soilless growth medium, and/or wherein the plant is contacted with the bioactive solution by spray, drench, flood, or drip irrigation.

5. The method of claim 1, wherein the bioactive solution is prepared by adding the water-soluble or water-miscible oil to a reservoir of water,
wherein said reservoir is a container, mixing vessel, mixing tank, mixing kettle, water softener system, water purification system, water filtration system, irrigation system, storage tank, a snowpack, a well, a pond, a stream, a river, a lake, a canal, or a municipal water source,
wherein the bioactive solution comprises at least one agricultural chemical, and/or
wherein the bioactive solution is prepared by metering the water-soluble or water-miscible oil in-line, in real time, to flowing or sprayed water.

6. The method of claim 1, wherein the amount of the water-soluble or water-miscible oil in the bioactive solution is from about 0.01% to about 5%, by weight or volume.

7. The method of claim 1, wherein the bioactive solution is prepared by adding the water-soluble or water-miscible oil to a reservoir of water.

8. The method of claim 7, wherein said reservoir is a container, mixing vessel, mixing tank, mixing kettle, water softener system, water purification system, water filtration system, irrigation system, storage tank, a snowpack, a well, a pond, a stream, a river, a lake, a canal, or a municipal water source.

9. The method of claim 1, wherein the bioactive solution is prepared by metering the water-soluble or water-miscible oil in-line, in real time, to flowing or sprayed water.

10. The method of claim 1, wherein the bioactive solution comprises at least one agricultural chemical.

11. The method of claim 10, wherein the agricultural chemical is selected from the group consisting of a fertilizer, an insecticide, an acaricide, a nematicide, a fungicide, a bactericide, a herbicide, a plant growth regulator, a biostimulant, a biopesticide, a nutrient, a drift reduction agent, a utility adjuvant, a water conditioner, a penetrant, a pH buffer, an activator, a surfactant, a stabilizer, a preservative, a sticker, a spreader, a wetting agent, an adjuvant, a diluent, a detergent, an adhesive, an anticaking agent, a dye, a dispersant, an emulsifying agent, a defoamer, an antimicrobial, an antifreeze, a pigment, a colorant, a carrier, or combination thereof.

12. The method of claim 1, wherein the plant is selected from the group consisting of crop plants, food crops, forage plants, fruit trees, nut trees, turfgrass, ornamentals, perennials, annuals, houseplants, bedding plants, and landscape plants.

13. The method of claim 1, wherein the plant is selected from the group consisting of maize, wheat, rice, oat, barley, sorghum, cowpea, sugarcane, soybean, canola, sunflower, safflower, cotton, hops, alfalfa, apple, pear, peach, plum, cherry, orange, grapefruit, lemon, lime, avocado, almond, cashew, English walnut, pecan, pistachio, hazelnut, strawberry, raspberry, blueberry, cranberry, grape, lettuce, potato, tomato, pepper, eggplant, sweet potato, cassava, squash, pumpkin, onion, carrot, celery, cabbage, cauliflower, broccoli, tobacco, beet, banana, pansy, petunia, begonia, and tall fescue.

14. A method for reducing water consumption by a plant, the method comprising: contacting a plant with a bioactive solution that is a combination of a water-soluble or water-miscible oil and water, wherein the water-soluble or water-miscible oil is the product of an ethoxylation process, a transesterification process, a saponification process, or a micromixing process, wherein the water-soluble or water-miscible oil is macadamia nut oil or castor oil, and wherein water consumption by the plant is reduced when compared to a control plant that has not been contacted with the bioactive solution.

15. A method for reducing water consumption by a plant, the method comprising: contacting a plant with a bioactive solution that is a combination of a water-soluble or water-miscible oil and water, wherein the water-soluble or water-miscible oil is the product of an ethoxylation process, a transesterification process, a saponification process, or a micromixing process, wherein the water-soluble or water-miscible oil comprises fatty alcohol, oleic acid, palmitoleic acid, apricot kernel oil, avocado oil, evening primrose oil, grape seed oil, hazelnut oil, pumpkinseed oil, rosehip oil, safflower oil, sunflower oil, walnut oil, wheat germ oil, neem oil, mink oil, lanolin, argan oil, abyssinian oil, *Salvia hispanica* oil (chia seed oil), *Calophyllum tacamahaca* seed oil (tamanu oil), squalane, sea buckthorn oil, meadowfoam oil, jojoba oil, olive oil, corn oil, sesame oil, *Oenocarpus bataua* oil, *Pentaclethra macroloba* oil, emu oil, or any combinations thereof, and wherein water consumption by the plant is reduced when compared to a control plant that has not been contacted with the bioactive solution.

\* \* \* \* \*